(12) United States Patent
Akman

(10) Patent No.: US 12,291,236 B1
(45) Date of Patent: May 6, 2025

(54) USING THE PRESENCE OF ROAD SURFACE AND SURROUNDING AREA ILLUMINATION TO DETECT OCCLUDED OBJECTS

(71) Applicant: Waymo LLC, Mountain View, CA (US)

(72) Inventor: Mehmet Akman, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 207 days.

(21) Appl. No.: 17/091,136

(22) Filed: Nov. 6, 2020

(51) Int. Cl.
*B60W 60/00* (2020.01)
*B60W 10/18* (2012.01)
(Continued)

(52) U.S. Cl.
CPC ........ *B60W 60/0015* (2020.02); *B60W 10/18* (2013.01); *B60W 10/20* (2013.01); *B60W 30/09* (2013.01); *B60W 30/0956* (2013.01); *G05D 1/0088* (2013.01); *G05D 1/0223* (2013.01); *G08G 1/165* (2013.01); *G08G 1/166* (2013.01); *B60W 2420/40* (2013.01);
(Continued)

(58) Field of Classification Search
CPC .. B60W 10/18; B60W 30/09; B60W 60/0015; B60W 30/0956; G05D 1/0088; G08G 1/165; G08G 1/166
See application file for complete search history.

(56) References Cited

U.S. PATENT DOCUMENTS 6,587,573 B1   7/2003   Stam et al.
8,457,827 B1   6/2013   Ferguson et al.
(Continued)

FOREIGN PATENT DOCUMENTS

CN   106778534 A   5/2017
CN   107000647 A   8/2017
(Continued)

OTHER PUBLICATIONS

Bajpayee, Abhishek, et al., Real-time Light Field Processing for Autonomous Robotics, 2018 IEEE/RSJ International Conference on Intelligent Robots and Systems (IROS) Madrid, Spain, Oct. 1-5, 2018, pp. 4218-4225.
(Continued)

*Primary Examiner* — Jelani A Smith
*Assistant Examiner* — Toya Pettiegrew
(74) *Attorney, Agent, or Firm* — Botos Churchill IP Law

(57) ABSTRACT

The technology relates to detection of a nearby occluded object based on illumination emitted from that object. Illumination by the occluded object of one or more areas in the surrounding area, for instance by headlights of an occluded vehicle, is detected by a perception system of a self-driving vehicle. The self-driving vehicle can classify the detected object to determine whether the illumination is caused by a vehicle or other road user, or from objects in the surrounding environment. Illumination data and other information can be evaluated by the self-driving vehicle, for instance to identify a type of the object, a location of the object along a roadway, to disambiguate the direction of travel of the other object, etc. As a result, the self-driving vehicle may infer the behavior of the other object and modify its own driving operations to account for the other object's presence and likely behavior.

25 Claims, 24 Drawing Sheets

(51) Int. Cl.
*B60W 10/20* (2006.01)
*B60W 30/09* (2012.01)
*B60W 30/095* (2012.01)
*G05D 1/00* (2024.01)
*G08G 1/16* (2006.01)

(52) U.S. Cl.
CPC . *B60W 2420/403* (2013.01); *B60W 2420/408* (2024.01); *B60W 2420/54* (2013.01); *B60W 2554/20* (2020.02); *B60W 2554/4023* (2020.02); *B60W 2554/4026* (2020.02); *B60W 2554/4041* (2020.02); *B60W 2554/4042* (2020.02); *B60W 2554/4044* (2020.02); *B60W 2555/00* (2020.02)

(56) References Cited

U.S. PATENT DOCUMENTS

| | | |
|---|---|---|
| 8,855,849 B1 | 10/2014 | Ferguson et al. |
| 9,224,053 B1 | 12/2015 | Ferguson et al. |
| 9,619,720 B2 | 4/2017 | Liken et al. |
| 9,892,330 B2 | 2/2018 | Jung et al. |
| 10,534,370 B2 | 1/2020 | Cavalcanti et al. |
| 10,767,989 B2 | 9/2020 | Zaum et al. |
| 2006/0018511 A1 | 1/2006 | Stam et al. |
| 2007/0263901 A1 | 11/2007 | Wu et al. |
| 2017/0124476 A1 | 5/2017 | Levinson et al. |
| 2017/0270798 A1 | 9/2017 | Ushiba et al. |
| 2017/0349100 A1 | 12/2017 | Miyazaki et al. |
| 2019/0092318 A1 | 3/2019 | Mei et al. |
| 2019/0122055 A1* | 4/2019 | Stopper .................. G06V 20/58 |
| 2019/0329768 A1* | 10/2019 | Shalev-Shwartz ... G06V 20/584 |
| 2019/0382007 A1 | 12/2019 | Casas et al. |
| 2020/0143177 A1* | 5/2020 | Naser ..................... G06V 20/58 |
| 2020/0278681 A1* | 9/2020 | Gier ....................... G06V 20/56 |
| 2020/0342623 A1* | 10/2020 | Cull ..................... G06V 30/2504 |
| 2021/0183026 A1* | 6/2021 | Auner ..................... G06T 5/008 |
| 2021/0201676 A1* | 7/2021 | Tariq ..................... G08G 1/012 |
| 2021/0256327 A1* | 8/2021 | Peranandam ........... G06F 18/25 |
| 2021/0302987 A1* | 9/2021 | Chebiyyam ............. G01S 3/802 |
| 2021/0341940 A1* | 11/2021 | Baik .................. G01C 21/3896 |
| 2022/0036119 A1* | 2/2022 | Parenti ................... G06V 10/60 |

FOREIGN PATENT DOCUMENTS

| | | |
|---|---|---|
| CN | 109703555 A | 5/2019 |
| CN | 110068835 A | 7/2019 |
| WO | 2019245982 A1 | 12/2019 |

OTHER PUBLICATIONS

Maddern, Will, et al., Illumination Invariant Imaging: Applications in Robust Vision-based Localisation, Mapping and Classification for Autonomous Vehicles, 2014, pp. 1-8.

Martin, D., et al., IVVI 2.0: An intelligent vehicle based on computational perception, Elsevier, Expert Systems with Applications 41, 2014, pp. 7927-7944.

Rosique, Francisca, et al., A Systematic Review of Perception System and Simulators for Autonomous Vehicles Research, Sensors 2019, 2019, 648, pp. 1-29.

Tang, Xiaofeng, et al., Sensor Systems for Vehicle Environment Perception in a Highway Intelligent Space System, Sensors 2014, 2014, 8513-8527; doi: 10.3390/s140508513, pp. 8513-8527.

The First Office Action for Chinese Patent Application No. 202111298877.X, Jan. 18, 2024, 20 Pages.

The Third Office Action for Chinese Patent Application No. 202111298877.X, Dec. 6, 2024, 19 Pages.

* cited by examiner

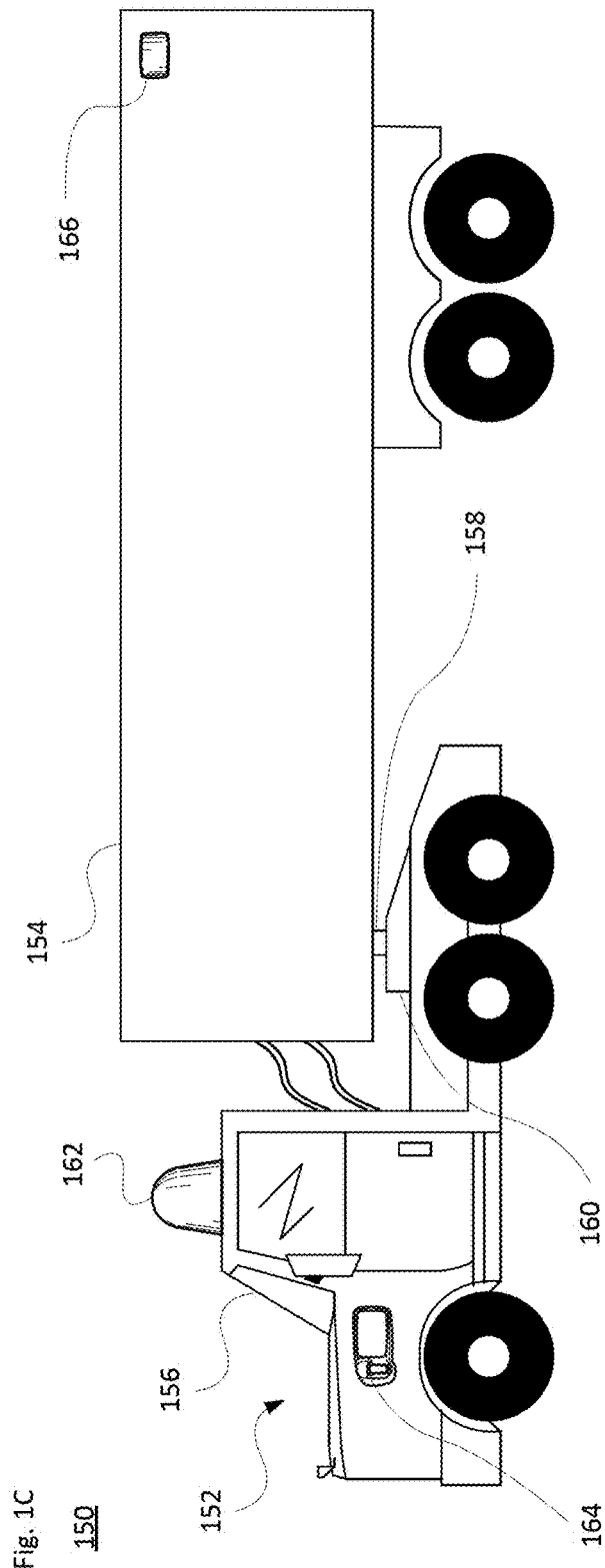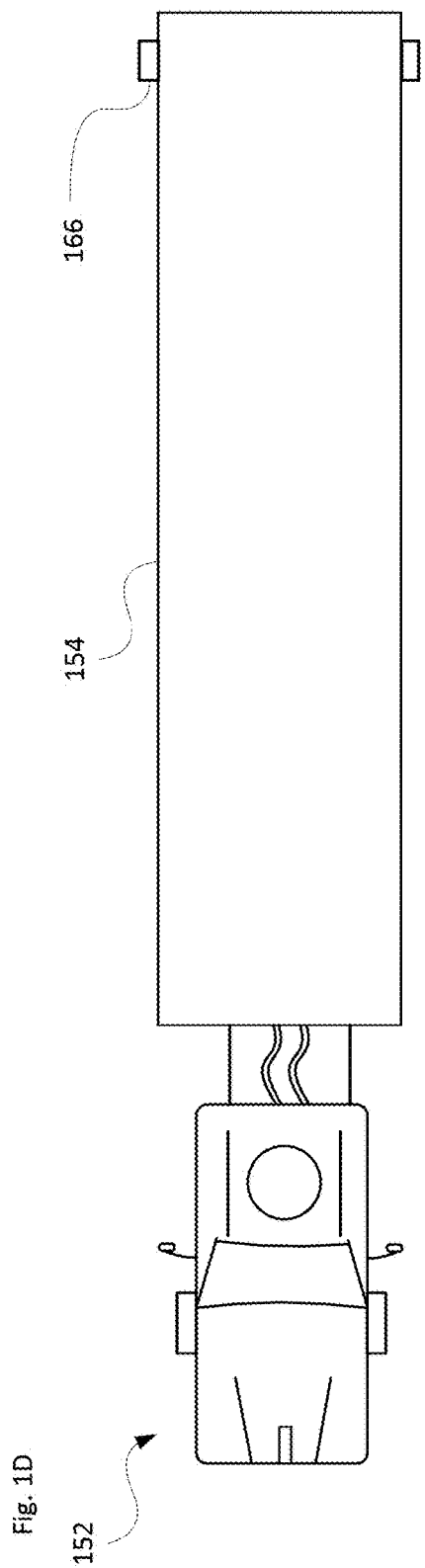

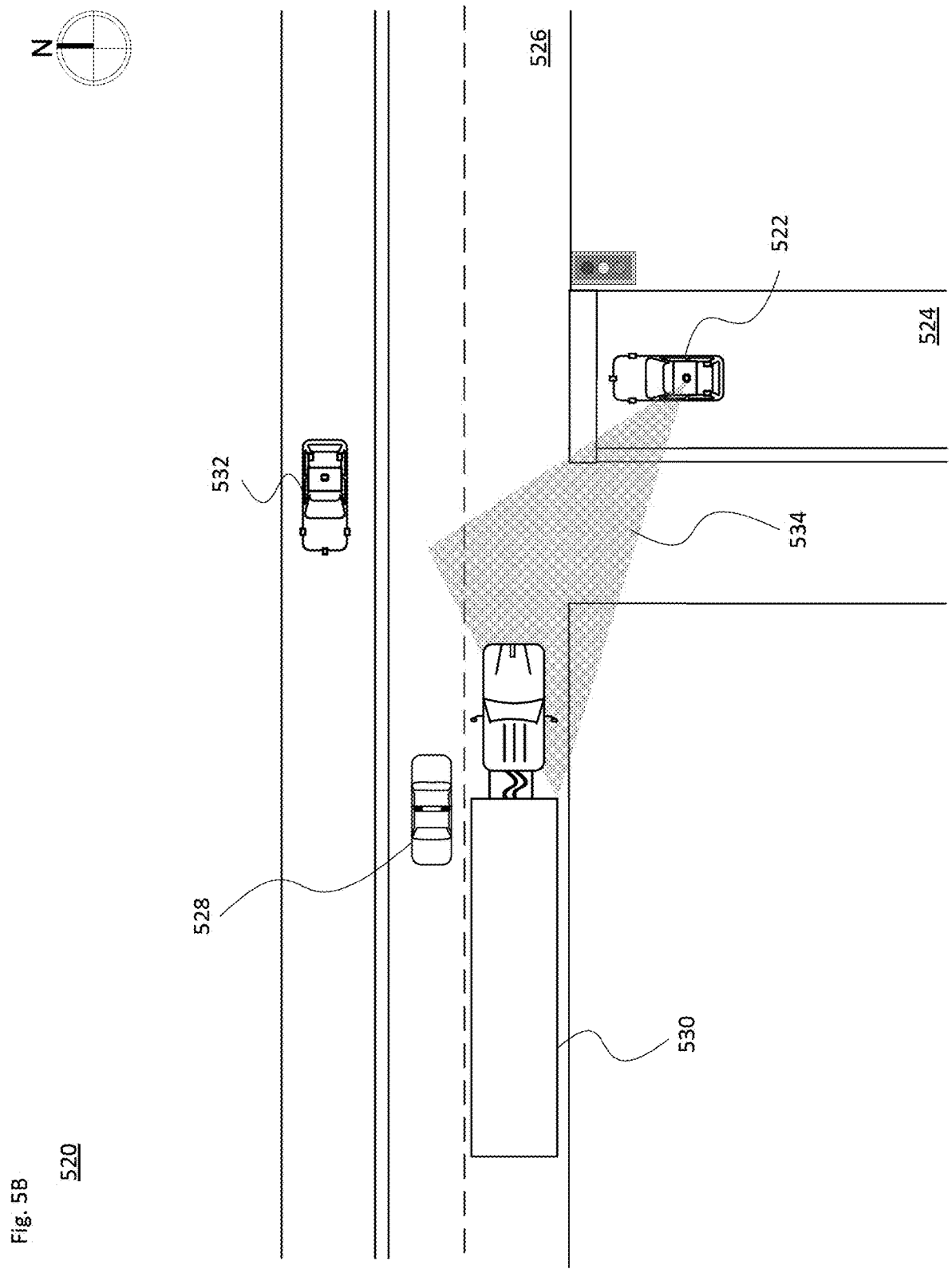

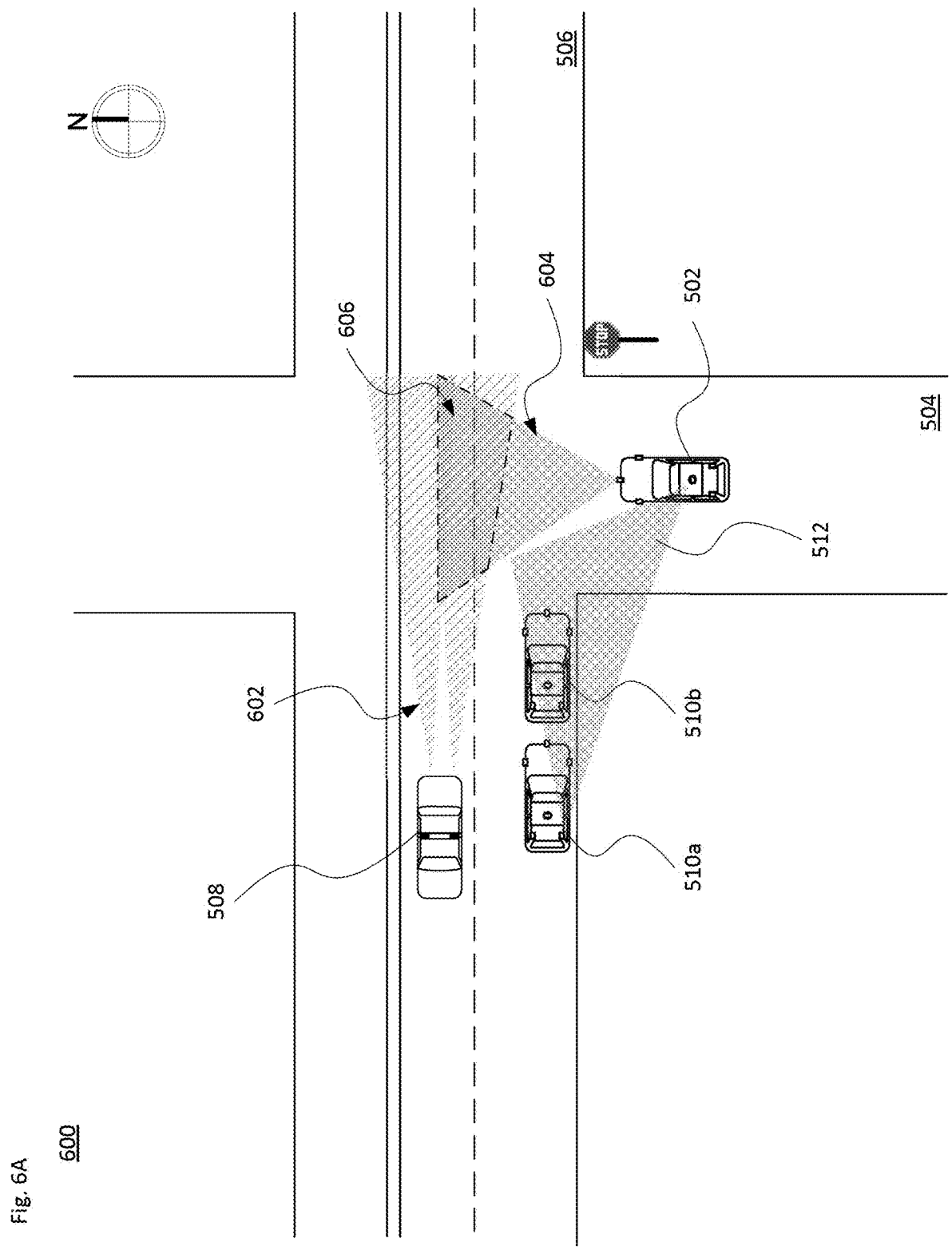

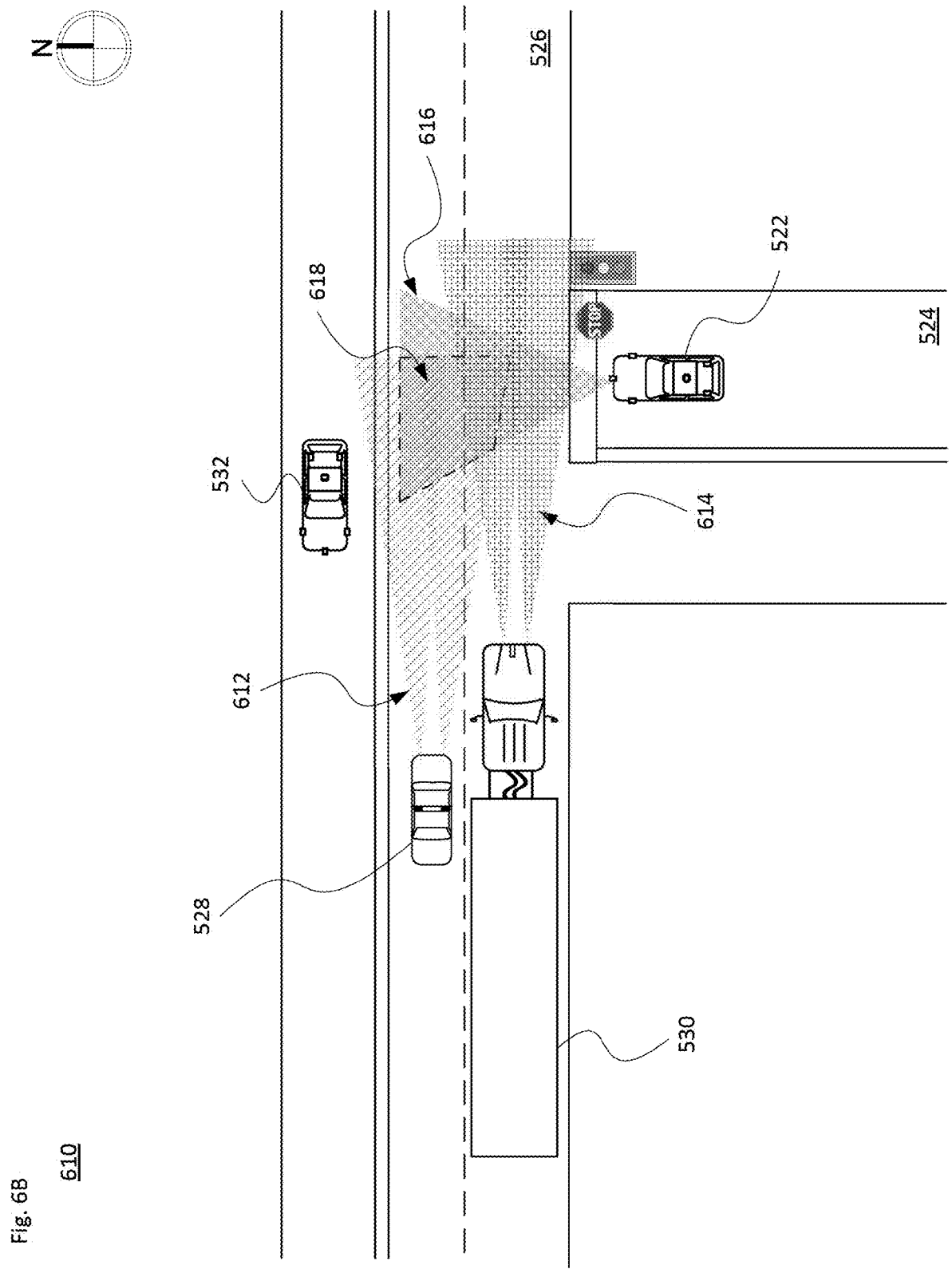

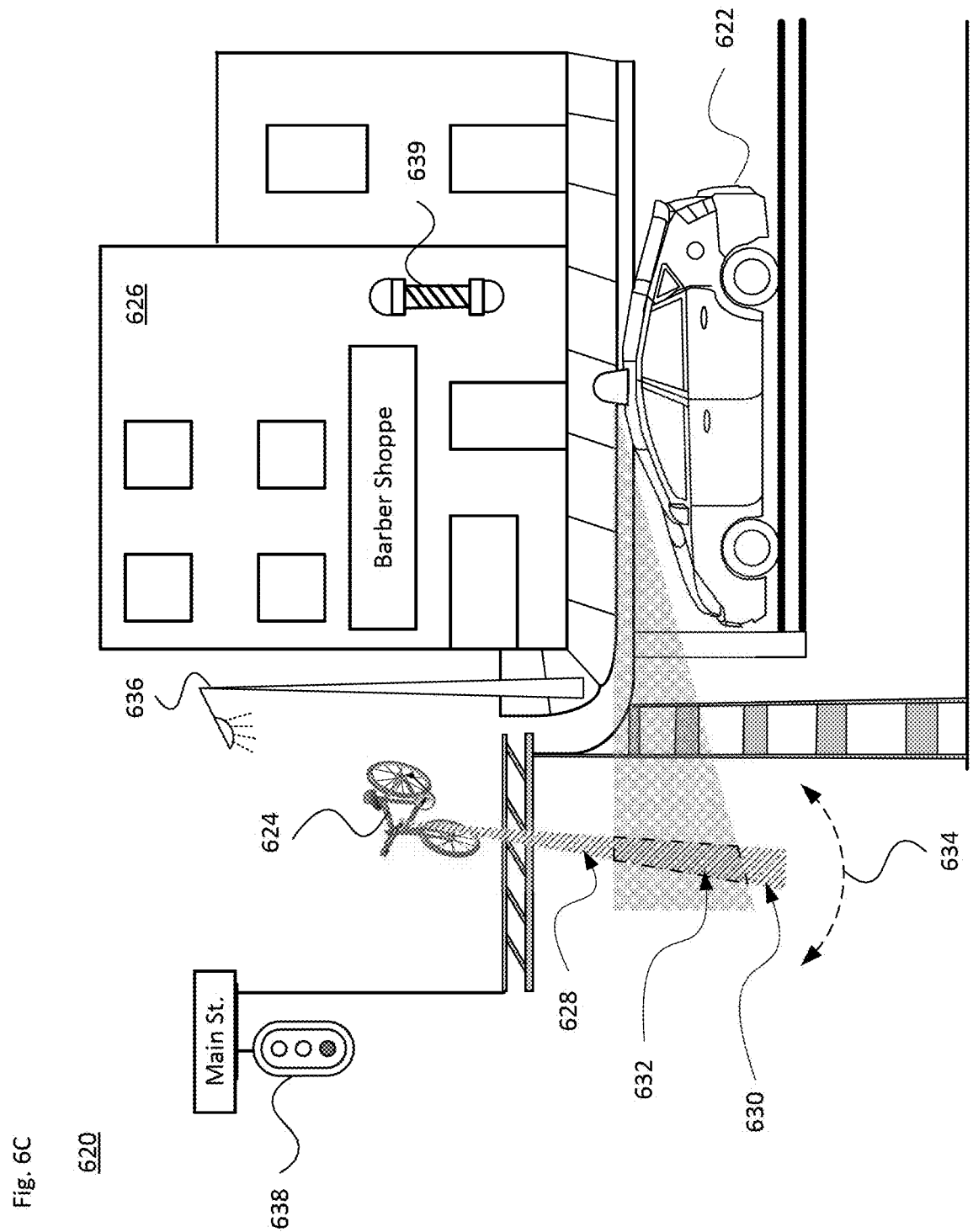

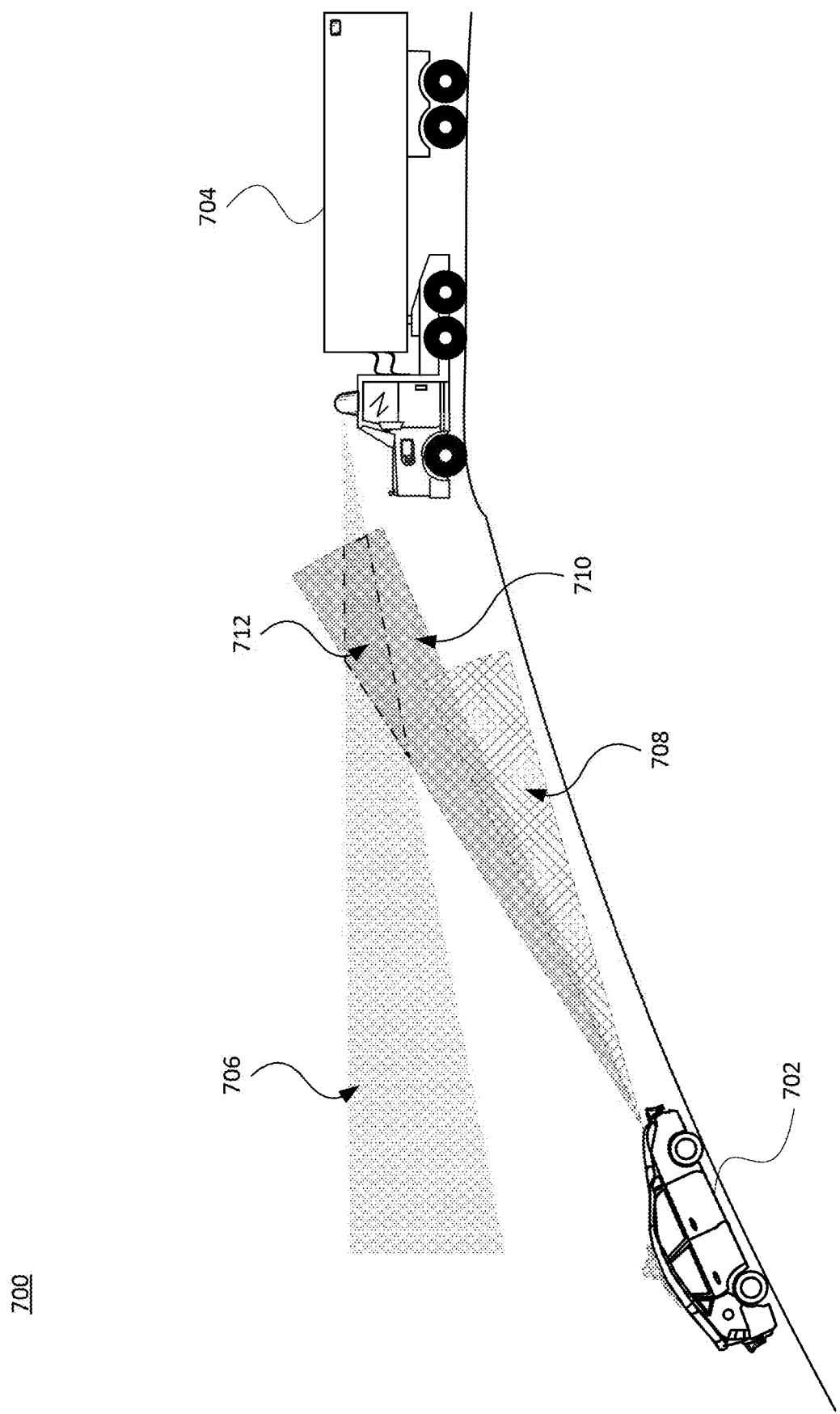

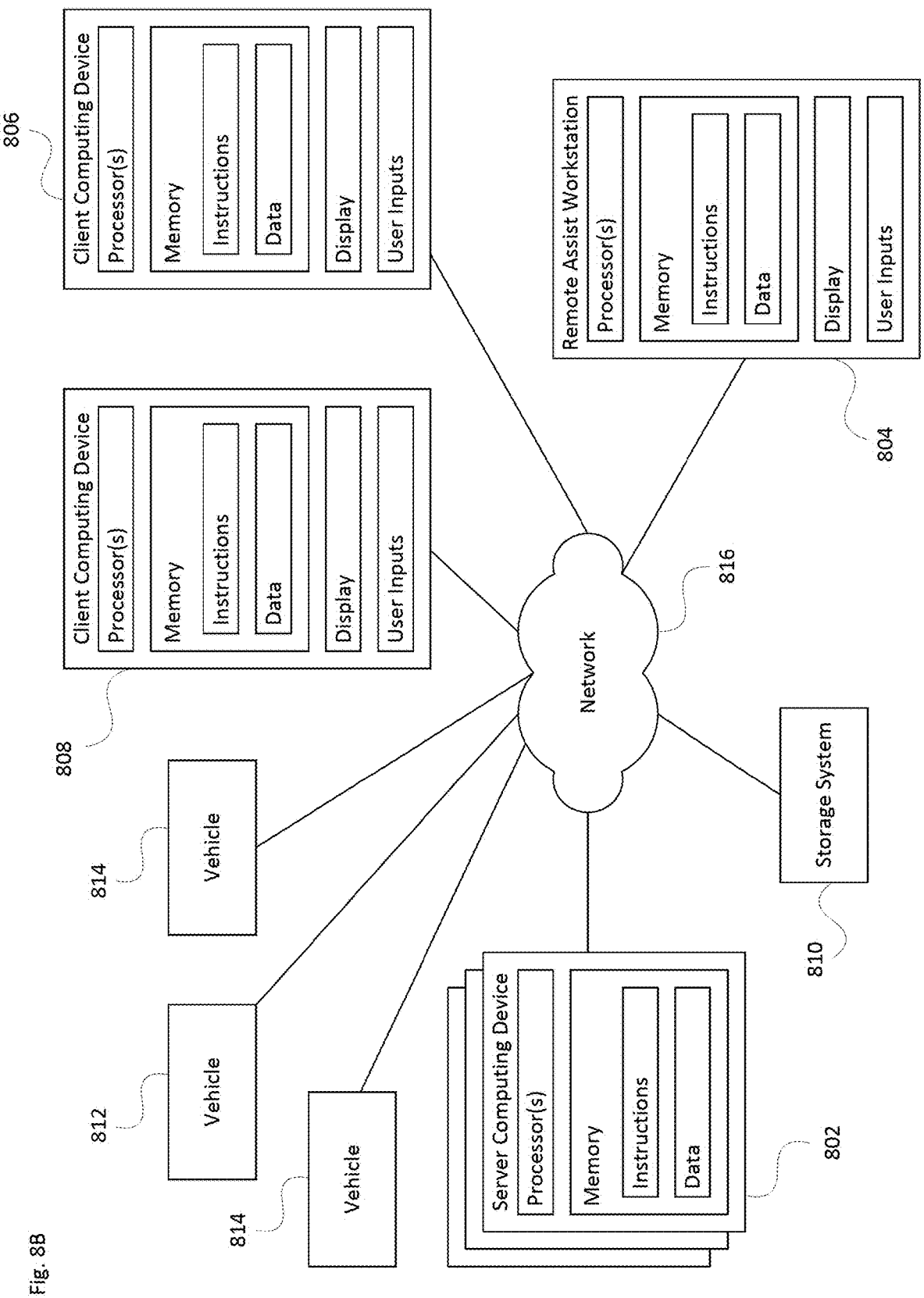

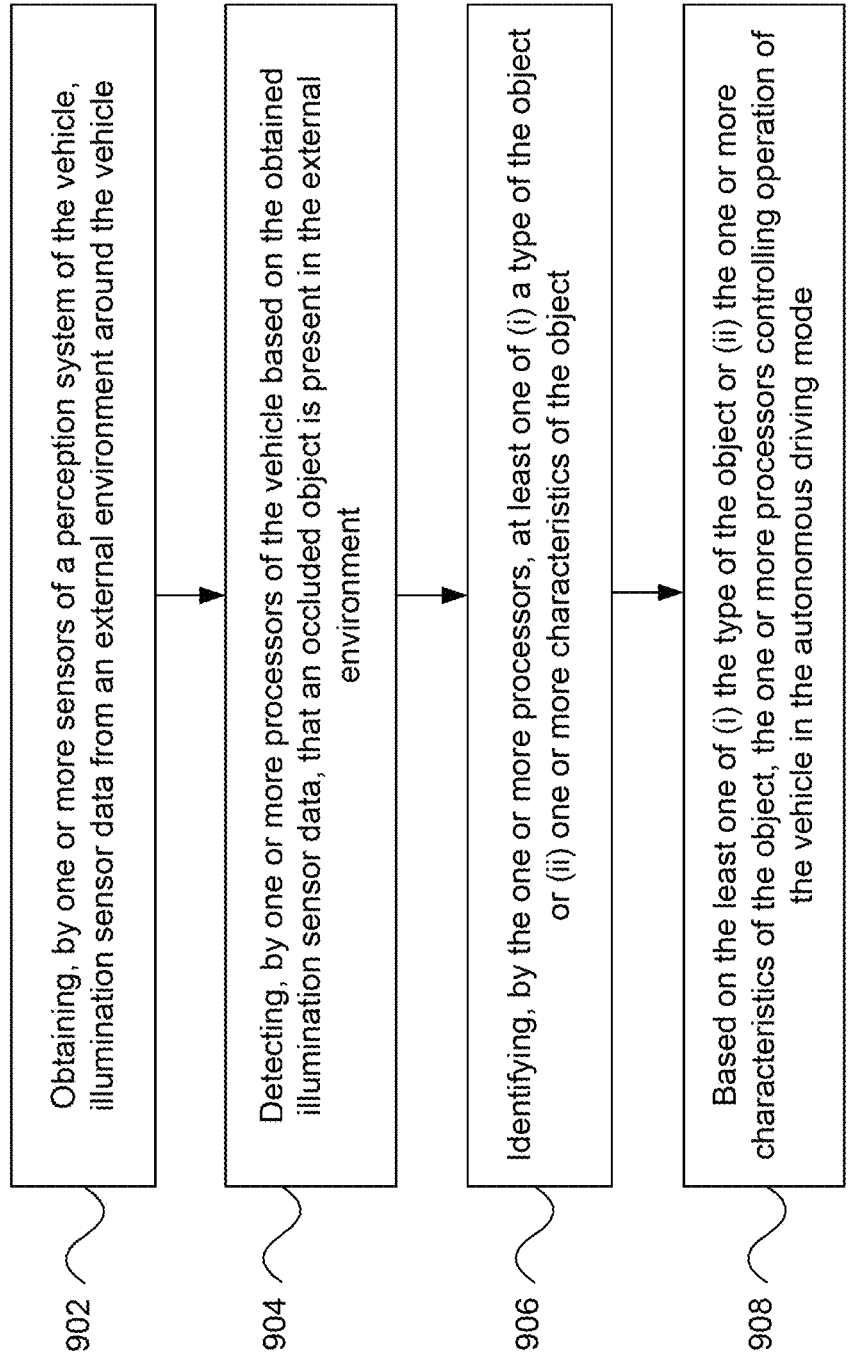

USING THE PRESENCE OF ROAD SURFACE AND SURROUNDING AREA ILLUMINATION TO DETECT OCCLUDED OBJECTS

BACKGROUND

Self-driving vehicles that operate in an autonomous driving mode may transport passengers, cargo or other items from one location to another. In many situations, it can be difficult to determine the presence of another vehicle or other object along the roadway, particularly when there is no line-of-sight to the other object. This can be particularly problematic at night and in other low-visibility conditions. The inability of the self-driving vehicle to effectively determine the presence of other road users may limit the vehicle's ability to take certain driving actions or otherwise change its driving behavior.

BRIEF SUMMARY

The technology relates to approaches for a self-driving vehicle to detect that another vehicle or other road user is nearby, even when that other object is occluded or there are poor environmental conditions. Illumination by the other object of one or more areas in the surrounding area, for instance by its headlights, is detected by a perception system of the self-driving vehicle. This illumination can include reflections off of the roadway, signage or other objects. The self-driving vehicle can determine whether such illumination is caused by a vehicle or other road user, or from objects in the surrounding environment (e.g., street lamps, stop lights, etc.). Illumination information and information about different types of vehicles and other objects can be evaluated by the self-driving vehicle, for instance to identify a type of vehicle, a location of the vehicle, or to disambiguate the direction of travel of the other vehicle. As a result, the self-driving vehicle may modify its operational (driving) behavior to account for the other object's presence.

According to one aspect, a method of operating a vehicle in an autonomous driving mode is provided. The method comprises obtaining, by one or more sensors of a perception system of the vehicle, illumination sensor data from an external environment around the vehicle; detecting, by one or more processors of the vehicle based on the obtained illumination sensor data, that an occluded object is present in the external environment; identifying, by the one or more processors, at least one of (i) a type of the object or (ii) one or more characteristics of the object; and based on the least one of (i) the type of the object or (ii) the one or more characteristics of the object, the one or more processors controlling operation of the vehicle in the autonomous driving mode.

In one example, the method further comprises the one or more processors inferring a behavior of the object based on the least one of (i) the type of the object or (ii) the one or more characteristics of the object.

In another example, the detecting or the identifying includes discriminating between multiple illumination sources to determine a presence of one or more road users in the external environment. Here, discriminating between multiple illumination sources may include identifying at least one fixed illumination source and at least one mobile illumination source. The at least one fixed illumination source may be a street light, a stop light, signage or a parked vehicle. The at least one mobile illumination source may be a passenger vehicle, a truck, a motorcycle, a bicycle or an emergency vehicle.

In a further example, the detecting or the identifying includes correlating multiple sets of the illumination sensor data to determine a source of light. Here, the multiple sets of the illumination sensor data may be obtained from different sensors of the perception system of the vehicle. The one or more characteristics of the object may include at least one of location, orientation relative to a roadway, size, shape, heading, or speed of movement relative to the vehicle.

In another example, the method further comprises, prior to controlling operation of the vehicle, disambiguating a direction of travel of the object. In a further example, detecting that the occluded object is present in the external environment includes evaluating the obtained illumination sensor data to determine whether an amount of detected light has one or more characteristics. Here, the one or more characteristics may include at least one of a minimum amount of brightness, wavelengths in a particular band, or light emitted by a particular type of illumination device.

In yet another example, the detecting includes comparing the obtained illumination sensor data to a baseline mapping of ambient illumination of the external environment around the vehicle. In this case, the baseline mapping may include identification of locations of one or more stationary illuminating objects in the external environment.

According to another aspect, a vehicle configured to operate in an autonomous driving mode is provided. The vehicle comprises a driving system including a steering subsystem, an acceleration subsystem and a deceleration subsystem to control driving of the vehicle in the autonomous driving mode. It also comprises a perception system including one or more sensors configured to detect objects in an environment external to the vehicle. The perception system is configured to obtain illumination sensor data from the external environment. The vehicle also includes a positioning system configured to determine a current position of the vehicle, as well as a control system including one or more processors. The control system is operatively coupled to the driving system, the perception system and the positioning system. The control system is configured to: detect, based on the obtained illumination sensor data, that an occluded object is present in the external environment; identify at least one of (i) a type of the object or (ii) one or more characteristics of the object; and based on the least one of (i) the type of the object or (ii) the one or more characteristics of the object, control operation of the vehicle in the autonomous driving mode.

In an example, the control system is further configured to infer a behavior of the object based on the least one of (i) the type of the object or (ii) the one or more characteristics of the object. The detection or the identification may include discriminating between multiple illumination sources to determine a presence of one or more road users in the external environment. The detection or the identification may alternatively or additionally include correlation of multiple sets of the illumination sensor data to determine a source of light.

In another example, the control system is further configured to disambiguating a direction of travel of the object. And in yet another example, the detection includes a comparison of the obtained illumination sensor data to a baseline mapping of ambient illumination of the external environment around the vehicle.

BRIEF DESCRIPTION OF THE DRAWINGS

FIGS. 1C-D illustrate an example cargo-type vehicle configured for use with aspects of the technology.

FIGS. 5A-B illustrate exemplary scenarios in accordance with aspects of the technology.

FIGS. 6A-F illustrate illumination scenarios in accordance with aspects of the technology.

FIGS. 7A-B illustrate additional scenarios in accordance with aspects of the technology.

FIGS. 8A-B illustrate an example system in accordance with aspects of the technology.

FIG. 9 illustrates an example method in accordance with aspects of the technology.

DETAILED DESCRIPTION

Operating a vehicle in a self-driving mode involves evaluating information about the vehicle's external environment. For instance, this can include determining whether there are static objects such as buildings, trees, signage, parked cars, etc. on a side of a roadway, as well as determining whether there are vehicles or other road users moving along nearby sections of the roadway. In certain scenarios, such as dense urban areas or other situations where the self-driving vehicle does not have an un-occluded view (an unobscured line of sight) of the crossing traffic at night time, detection of other road users can be very challenging. In many situations, the self-driving vehicle may need to nudge out onto the roadway to getter a better view of the traffic from its onboard sensors. However, entering into the path of traffic could itself be hazardous, especially if there is limited time to react to nearby oncoming vehicles.

At night time, in poor weather, or in other low-visibility situations, vehicles typically have their headlights (or fog lights, parking lights or daytime running lights) turned on to illuminate the road surface and nearby objects. In addition, high beams may be used in certain situations instead of low beams. According to an aspect of the technology, the self-driving vehicle's vision system is capable of detecting such lights lighting up the road surface. This signal can be used as an input to the onboard computer system's planning module, for instance to predict or expect one or more vehicles coming from the direction along which the road is illuminated even though such vehicles are not in a line of sight of the self-driving vehicle's perception system. As discussed further below, this can include estimating a vehicle's speed, disambiguating the direction of travel, differentiating between vehicle lights and street lamps or other fixed illumination, etc.

Example Vehicle Systems

Figure 1A:
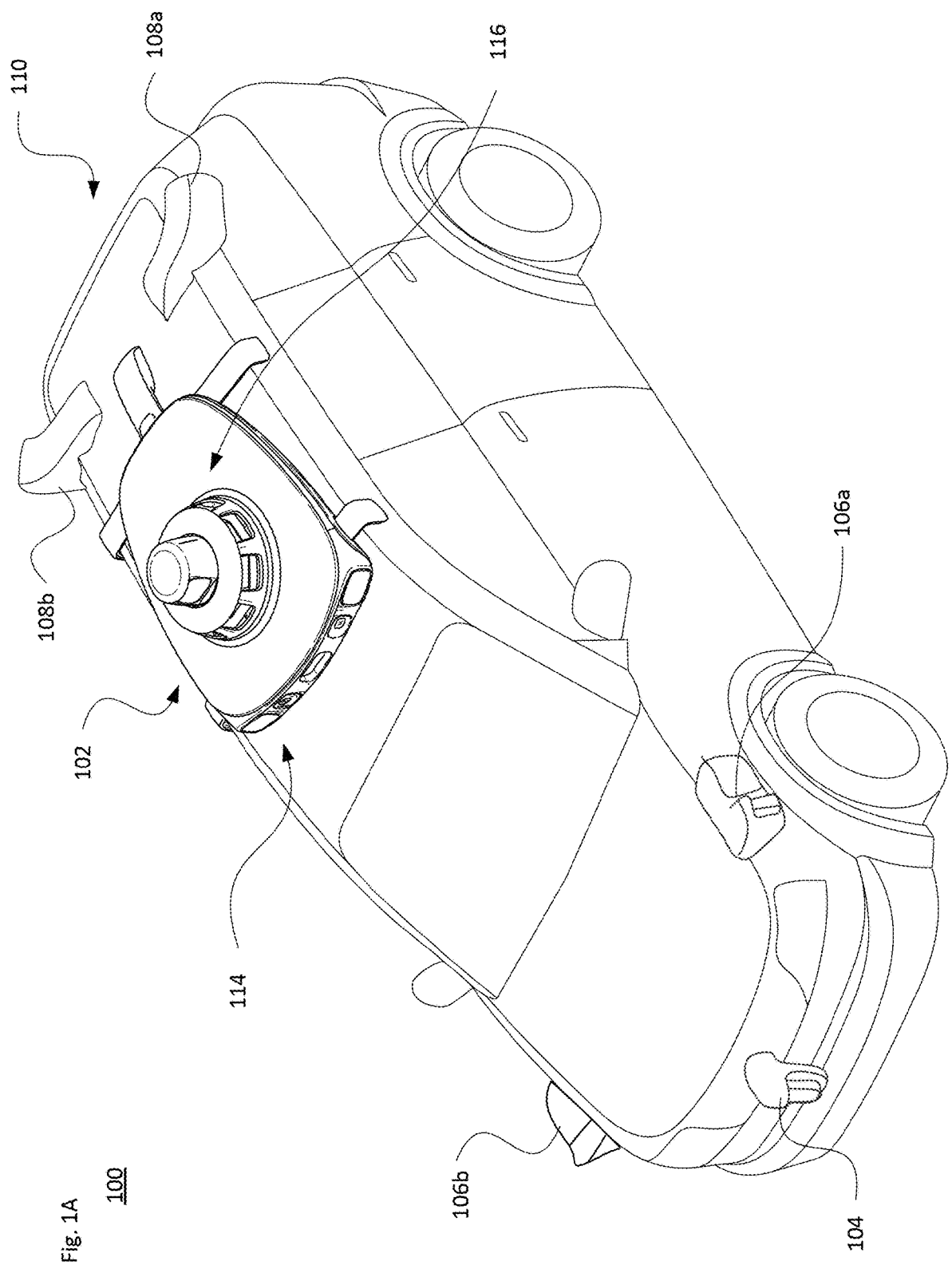
FIGS. 1A-B illustrate example self-driving vehicles in accordance with aspects of the technology.
Figure 1B:
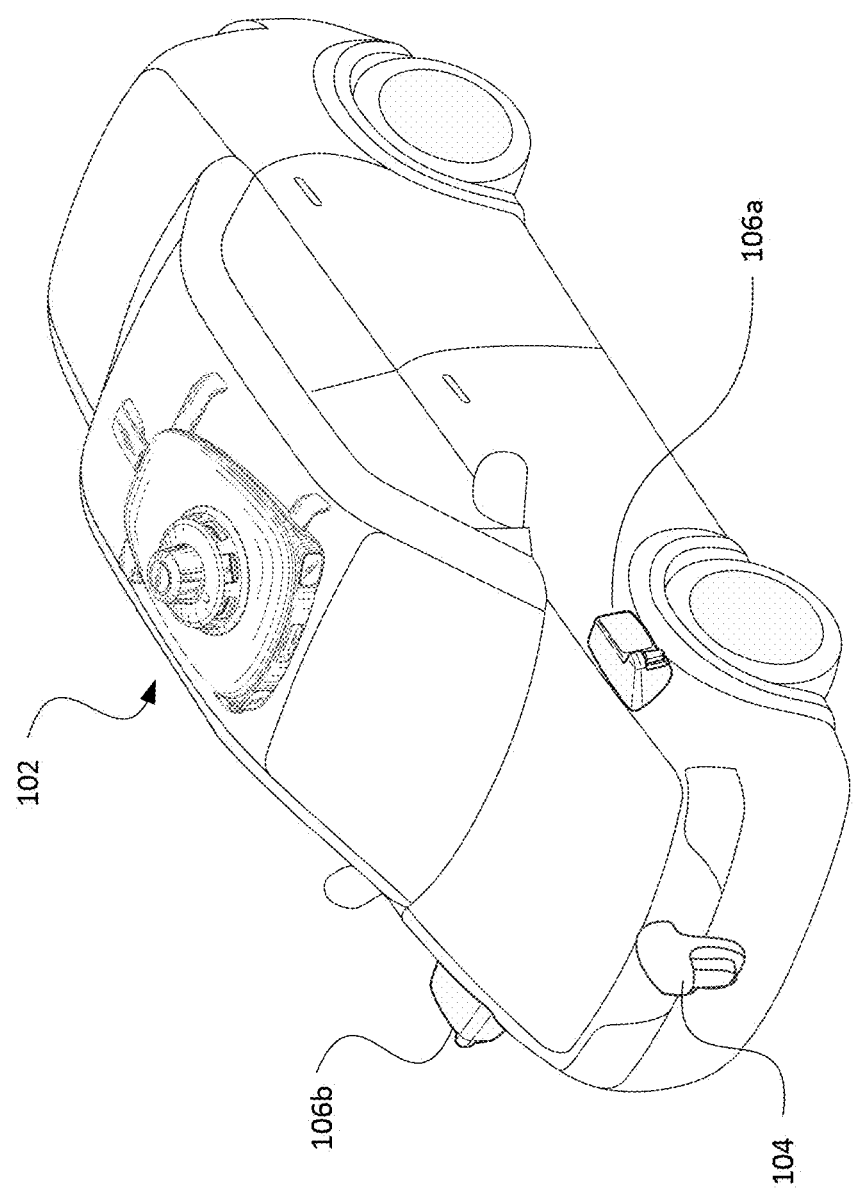

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
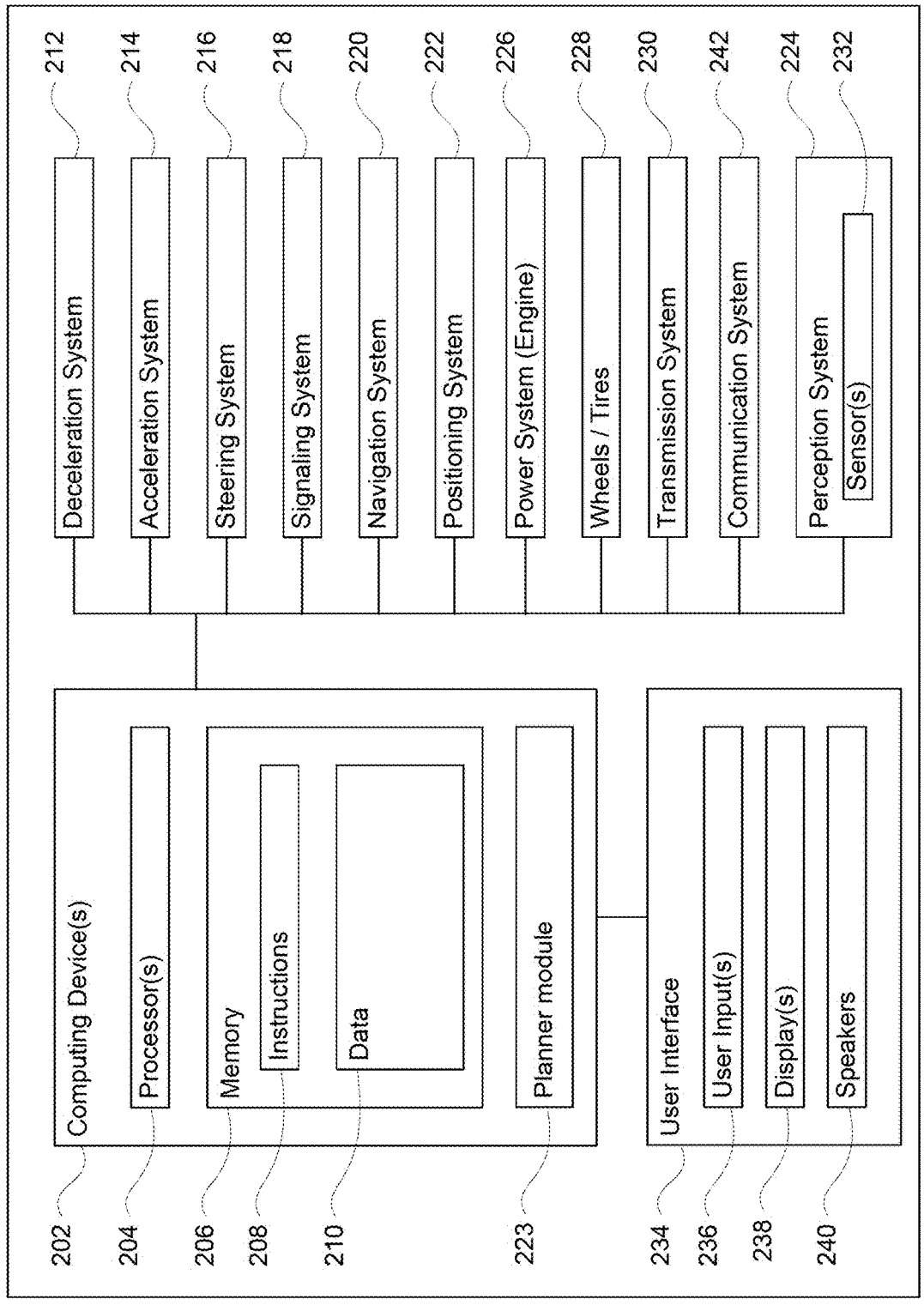
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include illumination-related information to perform, e.g., occluded vehicle detection. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings. The microphones may be capable of detecting sounds across a wide frequency band (e.g., 50 Hz-25 KHz) such as to detect various types of noises such as horn honks, tire squeals, brake actuation, etc.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform validation or calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
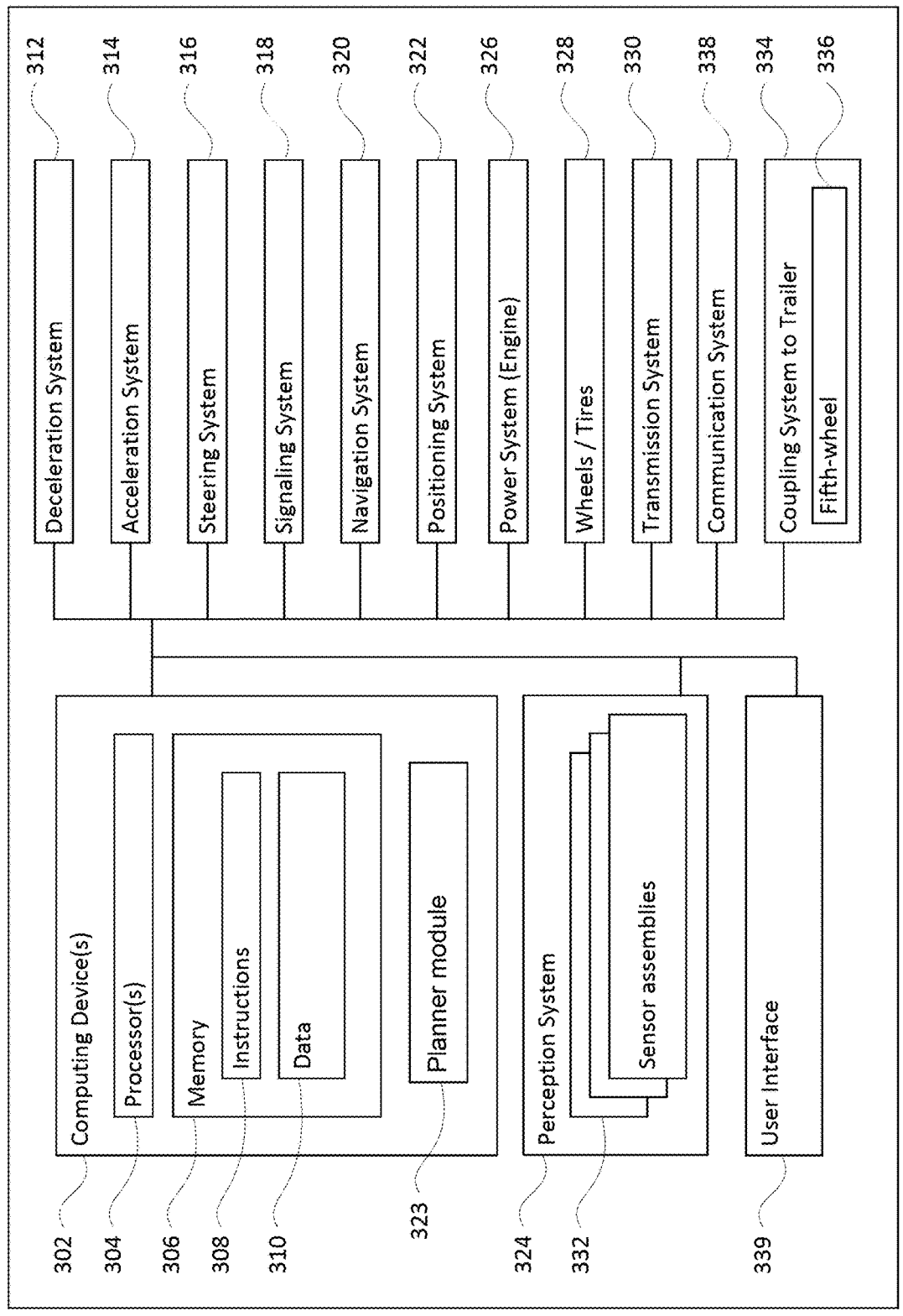
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the memory may include illumination-related information to perform, e.g., occluded vehicle detection.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
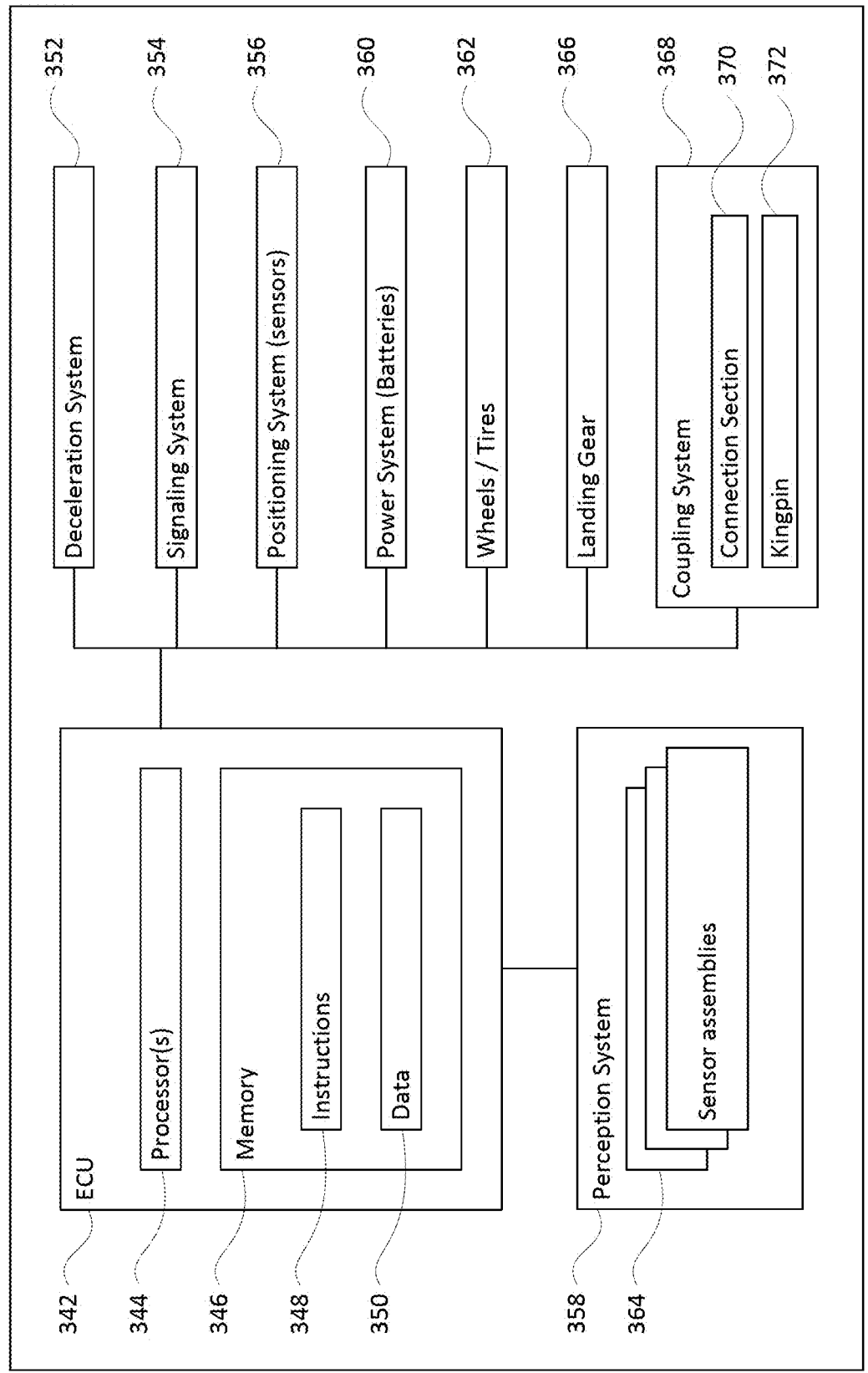
Figure 4A:
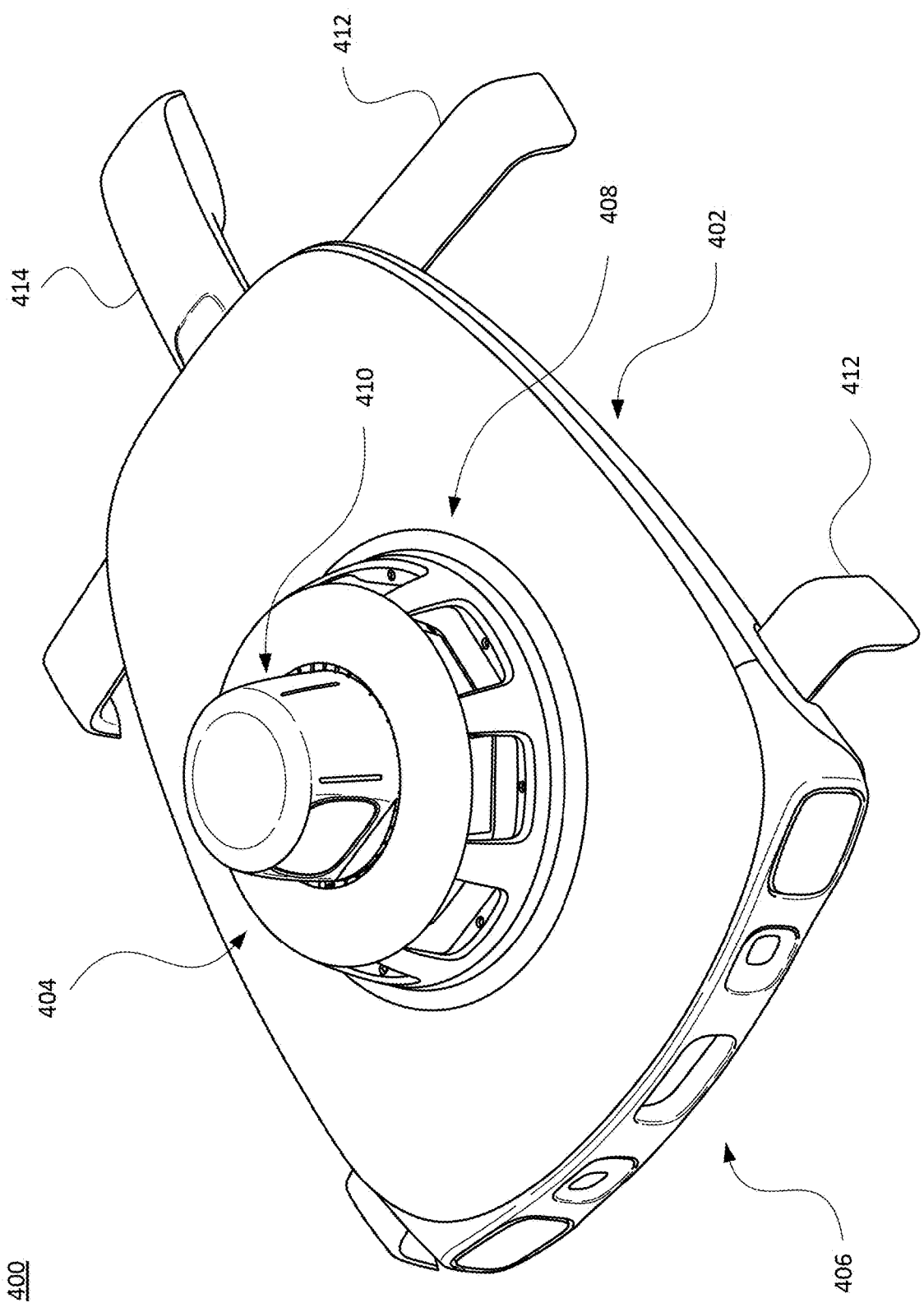
FIGS. 4A-G illustrate views of an elevated roof sensor assembly in accordance with aspects of the technology.
Figure 4B:
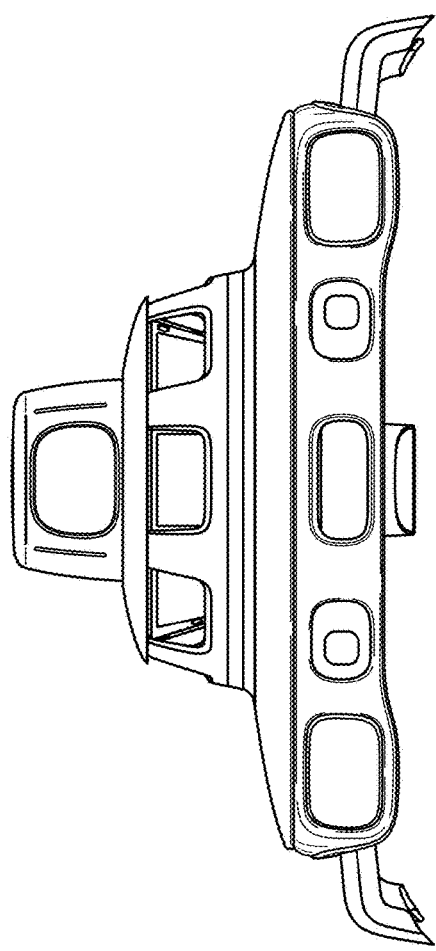
Figure 4C:
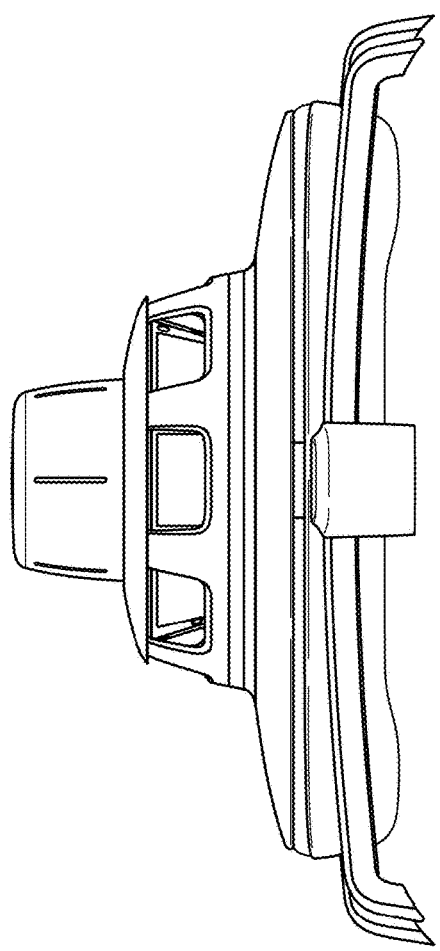
Figure 4D:
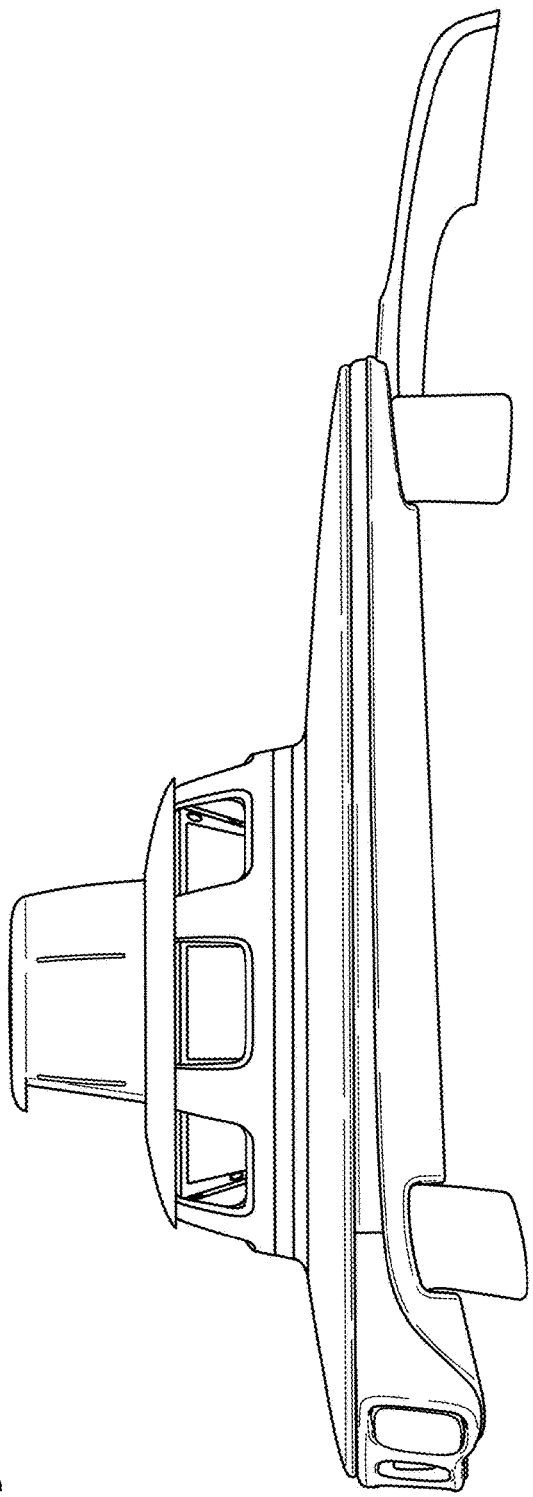
Figure 4E:
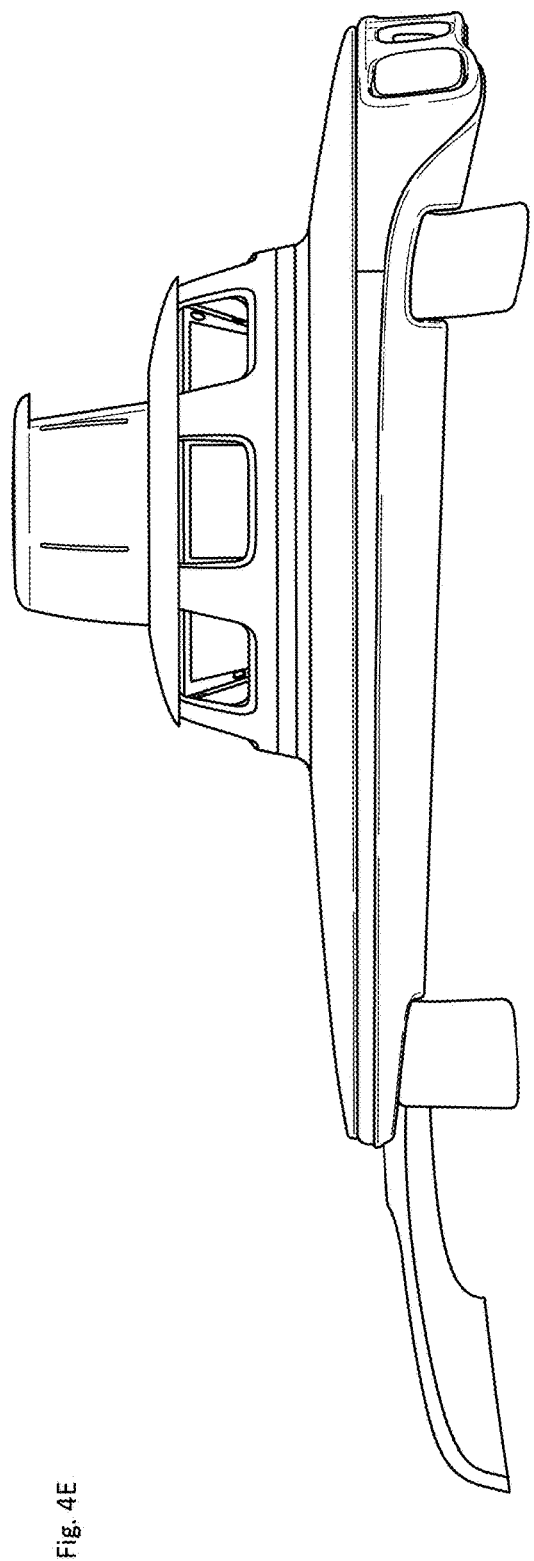
Figure 4F:
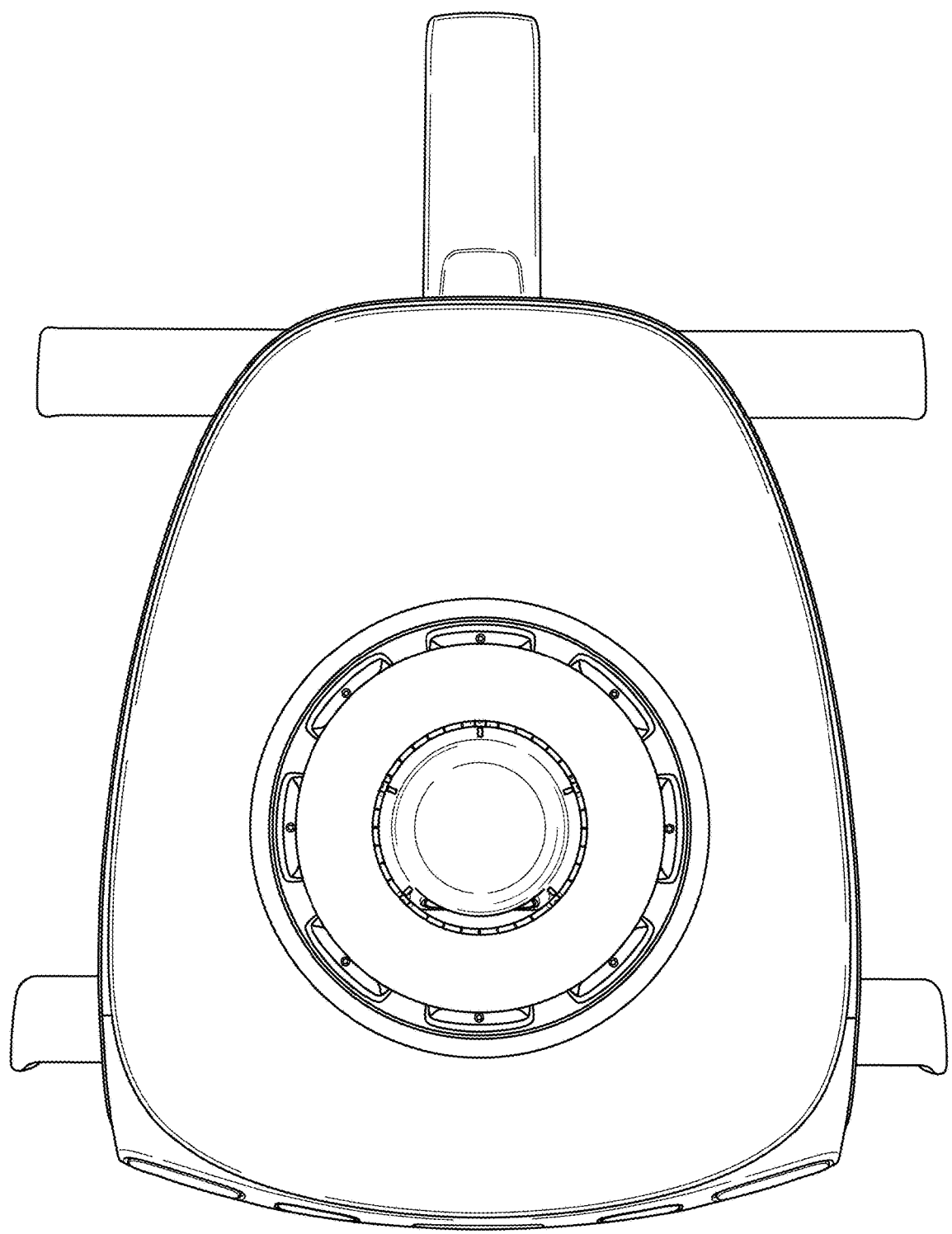
Figure 4G:
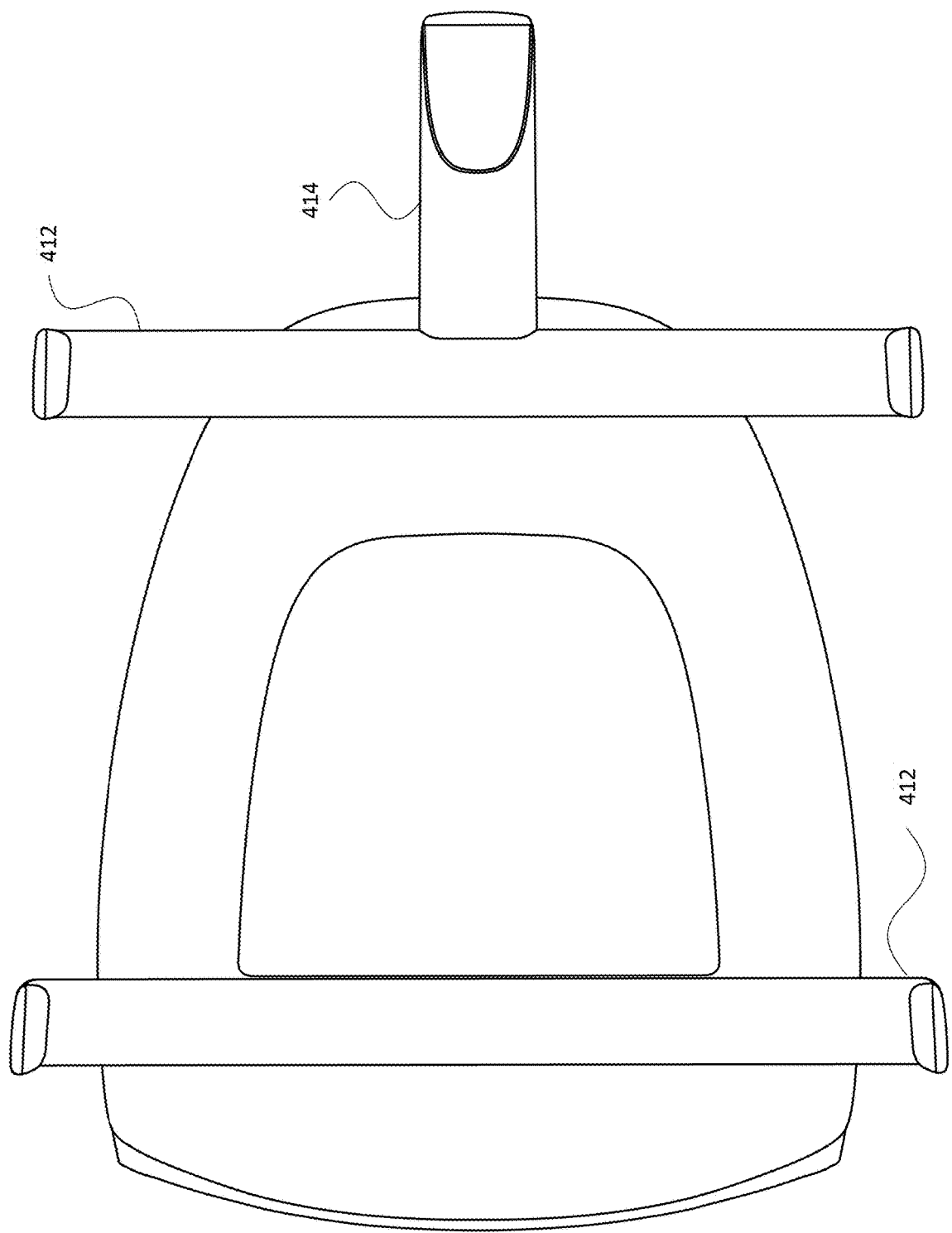

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

FIGS. 4A-G illustrate one example of a roof pod assembly 300 such as shown in FIGS. 1A-B. As noted above, the roof pod assembly may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). In the illustrated example, the roof pod assembly 400 includes a base section 402 arranged closer to the roof of the vehicle and an upper section 404 sitting above the base section and remote from the vehicle roof. Each of these sections may include various sensor suites of the types described above, local processing systems (e.g., to process raw data from the sensors) and other equipment such as wipers or other cleaning systems to clean the various sensors. By way of example only, the front side 406 of the base section 402 may include image sensors (e.g., optical cameras) and/or radar sensors arranged to detect objects in front of the vehicle as it drives in an autonomous mode.

The elevated upper section 404 may include different types of sensors arranged in different tiers or configurations, such as part of a dome-type or layer-cake type arrangement. By way of example, a series of image sensors (e.g., optical cameras) may be arranged in a circular or other configuration in a first part 408 of the upper section, such as to provide overlapping fields of view around the vehicle. And a second part 410 of the upper section may include one or more lidar units or other sensors, which may be configured to rotate 360° or to otherwise provide a full field of view around the vehicle. In this example, the first part 408 is mounted on an upper surface of the base section 402, and the second part 410 is disposed on top of the first part 308.

As seen in FIGS. 4A-G, the roof pod assembly 400 also includes a pair of legs or other support members 412. The support members 412 are affixed to a bottom surface of the base section 402, and are configured to connect along the left and right sides of the roof of the vehicle, for instance as illustrated in FIGS. 1A and 1B. The support members 412 are arranged so that the bottom surface of the base section 402 does not rest on or directly contact the vehicle roof. The roof pod assembly 300 may further include a conduit member 414, so that power, data and/or fluid conduits may be run between the vehicle and the roof pod assembly 400. The front support member 412 may be affixed adjacent or along the left/right A pillars of the vehicle frame, while the rear support member 412 may be affixed adjacent or along the left/right C (or D) pillars of the vehicle frame.

Elevating the roof pod assembly above the vehicle's roof allows for certain features to be incorporated into the bottom of the assembly. For instance, one or more water drains (not shown) can be included along the bottom, e.g., adjacent to the support members. One or more air intake vents (not shown) can also be provided, for instance to use as part of an active or passive cooling system for the roof pod assembly.

Figure 5A:
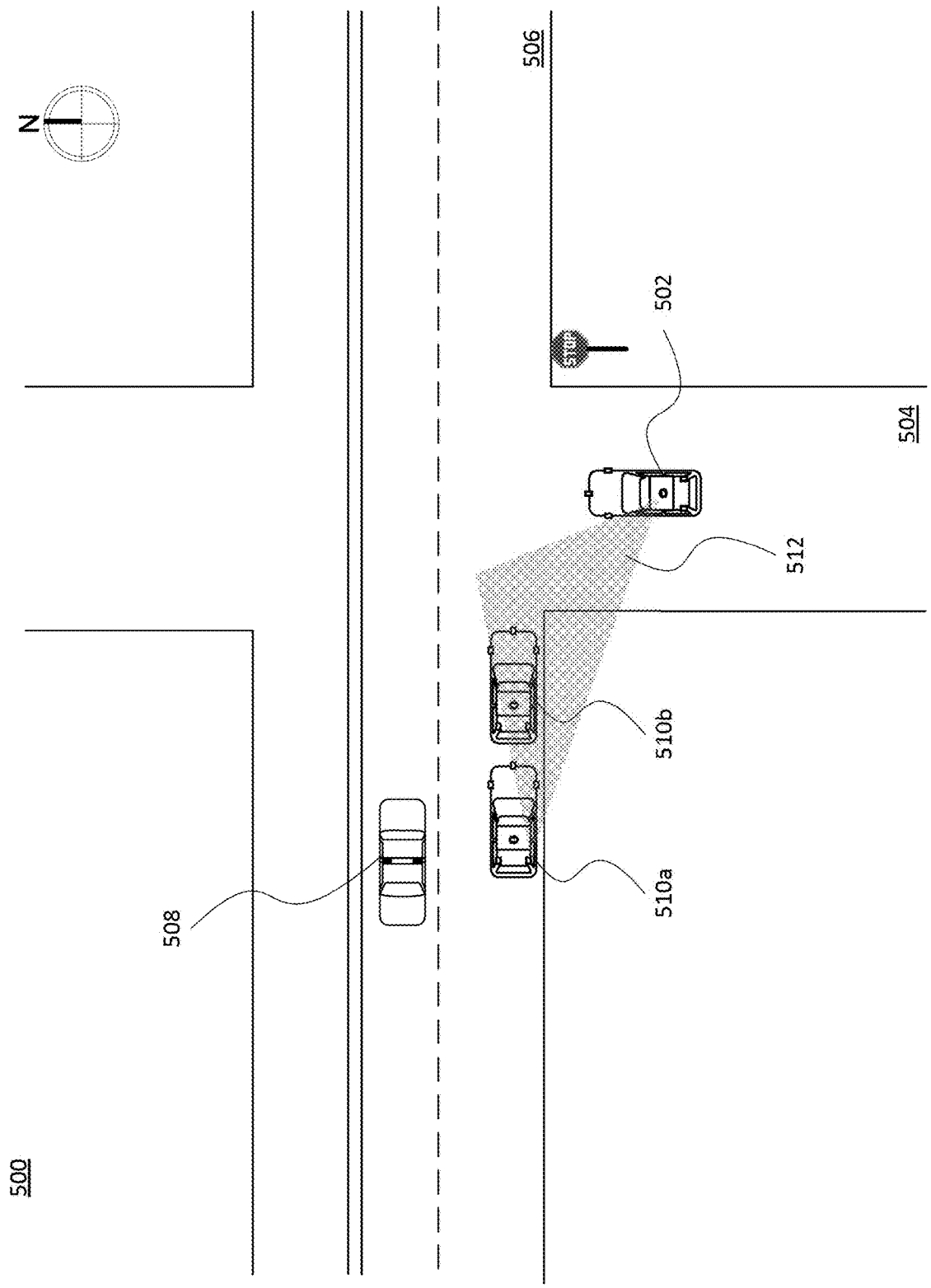

FIG. 5A illustrates one scenario 500, in which a self-driving vehicle 502 is stopped at a first road segment 504 having a stop sign, which intersects with a second road segment 506. In this scenario, another vehicle 508 is traveling eastbound along the second road segment 506. As shown, a pair of vehicles 510a, 510b are parked along the side of the second road segment 506. The vehicle 502 is shown by the shaded region as having a field of view 512 for one or more sensors of its perception system. However, due to the presences of vehicles 510a and 510b, the vehicle 508 is occluded and not within the field of view 512.

FIG. 5B illustrates another scenario 520, in which a self-driving vehicle 522 is stopped due to a stoplight at a first road segment 524 that intersects with a second road segment 526. In this scenario, another vehicle 528 is traveling eastbound along the second road segment 526. As shown, a truck 530 is also moving eastbound along the second road segment 506, while another vehicle 532 is traveling westbound along the second road segment 526. The vehicle 522 is illustrated by the shaded area as having a field of view 534 for one or more sensors of its perception system. However, due to the presence of the truck 530 moving eastbound along with the vehicle 528, the vehicle 528 is occluded and not within the field of view 534.

As noted above, at night time, in poor weather, or in other low-visibility situations, vehicles typically have their headlights, fog lights or other lighting turned on to illuminate the road surface and nearby objects. Such lighting may reflect off the roadway, other objects (e.g., sides of trucks, buildings, glass doors or windows, street signs, etc., and can be detected by the sensors of the self-driving vehicle. Such detected signals can be used as input to the self-driving vehicle's onboard computer system's planning module (e.g., 223 of FIG. 2 or 323 of FIG. 3A), for instance to indicate the presence of one or more occluded vehicles. The onboard system may be able to estimate a vehicle's speed, disambiguate the direction of travel, and differentiate between vehicle lights and street lamps or other fixed illumination. This enables the planner module or another part of the onboard system to make driving decisions such as wait for the occluded vehicle to pass, change lanes, brake, etc.

FIG. 6A illustrates a first scenario 600 based on the arrangement from FIG. 5A. As shown here, the vehicle 508 has its headlights on, creating beam patterns 602 on the road segment 506. Here, while the vehicle 508 is occluded from the field of view 512 by the parked cars 510a and 510b, one or more sensors of the self-driving vehicle 502 have another field of view 604 as indicated by the shaded area in front of vehicle 502. The dash-dot region 606 indicates an area in which the field of view 604 is able to detect at least a portion of the beam patterns 602. This can be done, for instance, via an optical camera sensor. Here, because the vehicles 510a and 510b may be determined to be not moving and/or that their headlights are not on, the presence of the detected portion of the beam patterns 602 can be used by the self-driving vehicle as a signal that there is another object on the road that is occluded from its line of sight. The size or shape of the detected portion of the beam patterns 602, either alone or in conjunction with other information from the signal (e.g., intensity of the light, wavelength(s) of light, doppler effect, etc.) may be used to indicate the presence of an occluded vehicle, its approximate speed, object type, direction of travel and/or other information which can be used by the self-driving vehicle to make driving decisions in real time.

FIG. 6B illustrates a second scenario 610 based on the arrangement from FIG. 5B. Similar to the scenario 610, vehicle 528 has its lights on, creating beam patterns 612 on the road segment 526. Here, not only is vehicle 528 occluded via line of sight from the self-driving vehicle 522, but the truck 530 also has its lights on, creating beam patterns 614 on the road segment 526. In this scenario, the self-driving vehicle 522 has a front field of view 616. In this case, the dash-dot region 618 indicates an area in which the field of view 616 is able to detect at least a portion of the beam pattern 612. In this example, the field of view 616 may also encompass a portion of the beam pattern 614 from the truck 530. While the beam pattern 614 may be expected from the truck 530, especially at night time or in poor visibility conditions (e.g., overcast, fog, snow, dust storm, etc.), the detected portion of the beam pattern 612 may not be expected due to the line of sight occlusion of the vehicle 528. Similar to the scenario 600, the size or shape of the detected portion of the beam patterns 612, either alone or in conjunction with other information from the signal (e.g., intensity of the light, wavelength(s) of light, doppler effect, etc.) may be used to indicate the presence of an occluded vehicle, its approximate speed, object type, direction of travel and/or other information which can be used by the self-driving vehicle to made driving decisions in real time. This approach may also include using information about the beam pattern 614 and the detected truck 530 to identify a position and/or speed of the vehicle 528 relative to the truck. By way of example, the angle of the beam pattern from the truck may be different than the angle of the beam pattern from the other vehicle, which can indicate differences in elevation above the road surface and thus different heights of the vehicles.

Figure 6D:
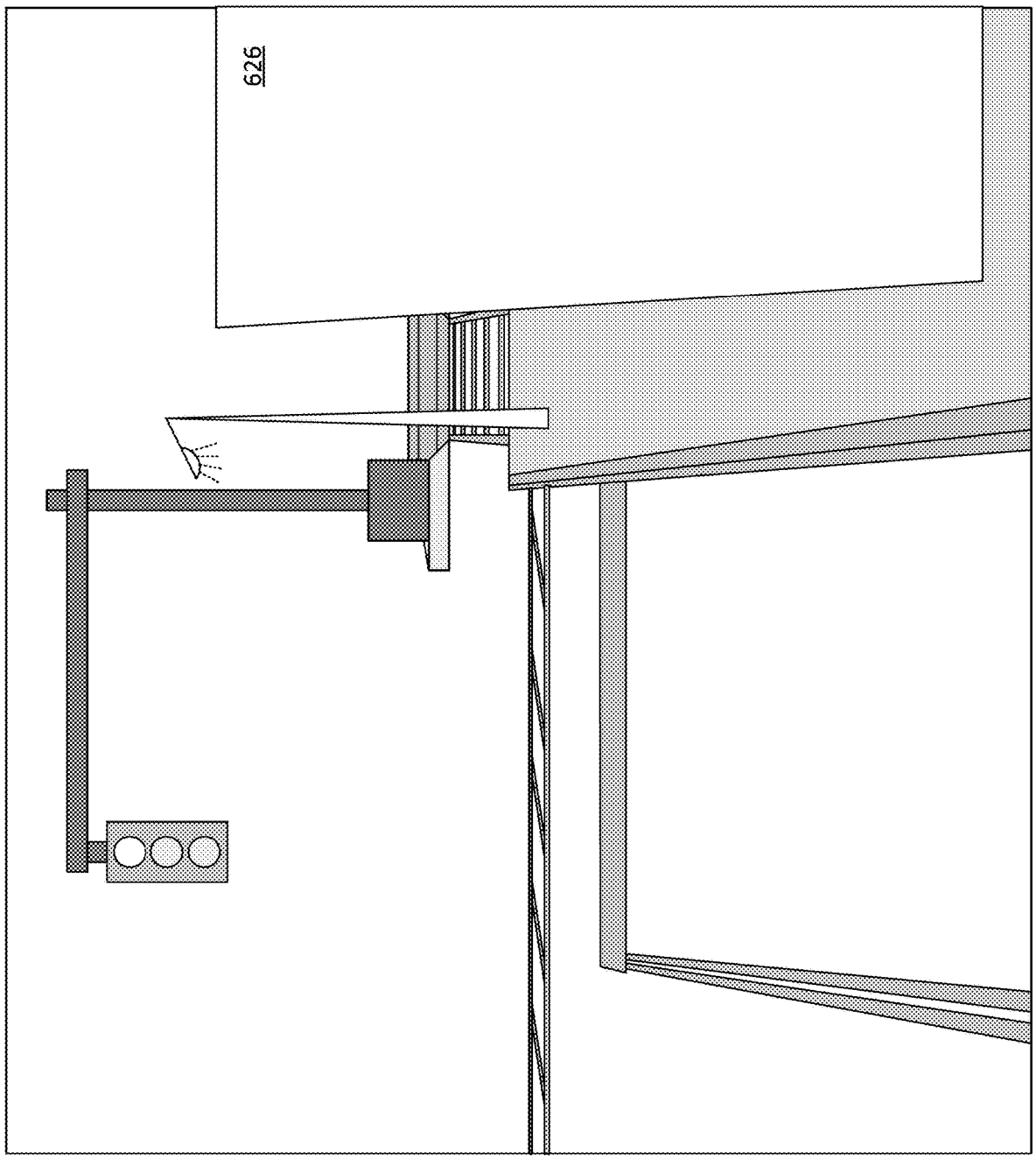

FIGS. 6C-6D illustrate another scenario 620. In this scenario, self-driving vehicle 622 is waiting at an intersection. As shown in FIG. 6C, bicycle 624 is on the cross-street adjacent to building 626, although the bicycle cannot be seen by the self-driving vehicle in FIG. 6D due to the building. However, in this scenario the bicycle 624 has a light, e.g., a halogen or LED light that has a relatively narrow beam pattern 628. This beam pattern 628 is detectable by one or more sensors (e.g., optical imaging devices) of the self-driving vehicle having a field of view 630. In this case, dash-dot region 632 indicates the area in which the field of view 630 is able to detect at least a portion of the beam pattern 628. Similar to the scenarios above, the size or shape of the detected portion 632 of the beam patterns 628, either alone or in conjunction with other information from the signal (e.g., intensity of the light, wavelength(s) of light, etc.) may be used to indicate the presence of an occluded object, its approximate speed, object type, direction of travel and/or other information which can be used by the self-driving vehicle to made driving decisions in real time. In this case, the system may determine that the object has only a single light. It may use other information, including brightness of the light or a swept path of the beam pattern 628, as shown by the arcuate dotted line 634, to identify that the object is a bicycle (or scooter or motorcycle), for instance because the swept path is caused by pivoting of the front wheel of the object. Addition information, such as whether the light is strobing or otherwise flashing, may also help in determining what type of object it is (e.g., bicyclist v. motorcyclist, since a bicycle's light may be more likely to strobe than a motorcycle's light is to flash on and off).

In addition to detecting emitted light from vehicles and other moving objects along (or adjacent to) the roadway, the self-driving vehicle's perception system may also detect light from stationary objects. For instance, as shown in FIG. 6C, a street lamp 636 may provide illumination to the sidewalk or other areas near the intersection, a traffic light 638 may provide different colored lights to indicate stop, yield and go, and a barber pole 639 may flash or provide other patterns of light adjacent to the roadway. In this scenario, depending on the arrangement and type(s) of sensors of the perception system, the self-driving vehicle may detect such ambient illumination.

Because such ambient illumination may affect identification of occluded objects of interest, identifying the cause(s) of the ambient illumination may be used to ignore or discard such illumination during analysis of perception system data. This can include identifying whether an object is a stationary object, as well as the orientation of the source of the light relative to the roadway (e.g., pointing downward substantially vertically such as with street lamp 636, pointing downward at an oblique angle such as with traffic light 638, or illuminating the roadway from an off-road source such as with barber pole 639). It can also include determining a bulb type of the light source (e.g., compact fluorescent lamp, metal halide or high pressure sodium lamp for the street lamp 636, incandescent or LED lights for the traffic light 638, LED or neon lights for the barber pole 639, etc.). The wavelength(s) of such lights may also be factored into the evaluation.

Any or all of this information may be used to create a baseline mapping of ambient illumination, for instance during one or more times of day (e.g., evening, overnight or daytime), in different weather conditions, etc. This baseline may be stored in a database maintained by or uploaded to the self-driving vehicle. For instance, it could be utilized as a layer or overlay in highly detailed maps used by the self-driving vehicle. The map information could identify the locations of stationary illuminating objects. In one example, the baseline mapping of ambient illumination may be curated by a remote system used that can disseminate such information to a fleet of self-driving vehicles. By evaluating such information, the system is able to compare a static scene with a changing illumination, which can be used as a sign that there is a potential object that is moving. This may include distinguishing between street lights or flashing lights (e.g., from construction signs) versus other lights that may be moving. Since moving objects will cause a light or lit area that changes in size and shape, such differences can be used to identify the presence of an occluded road user.

Figure 6E:
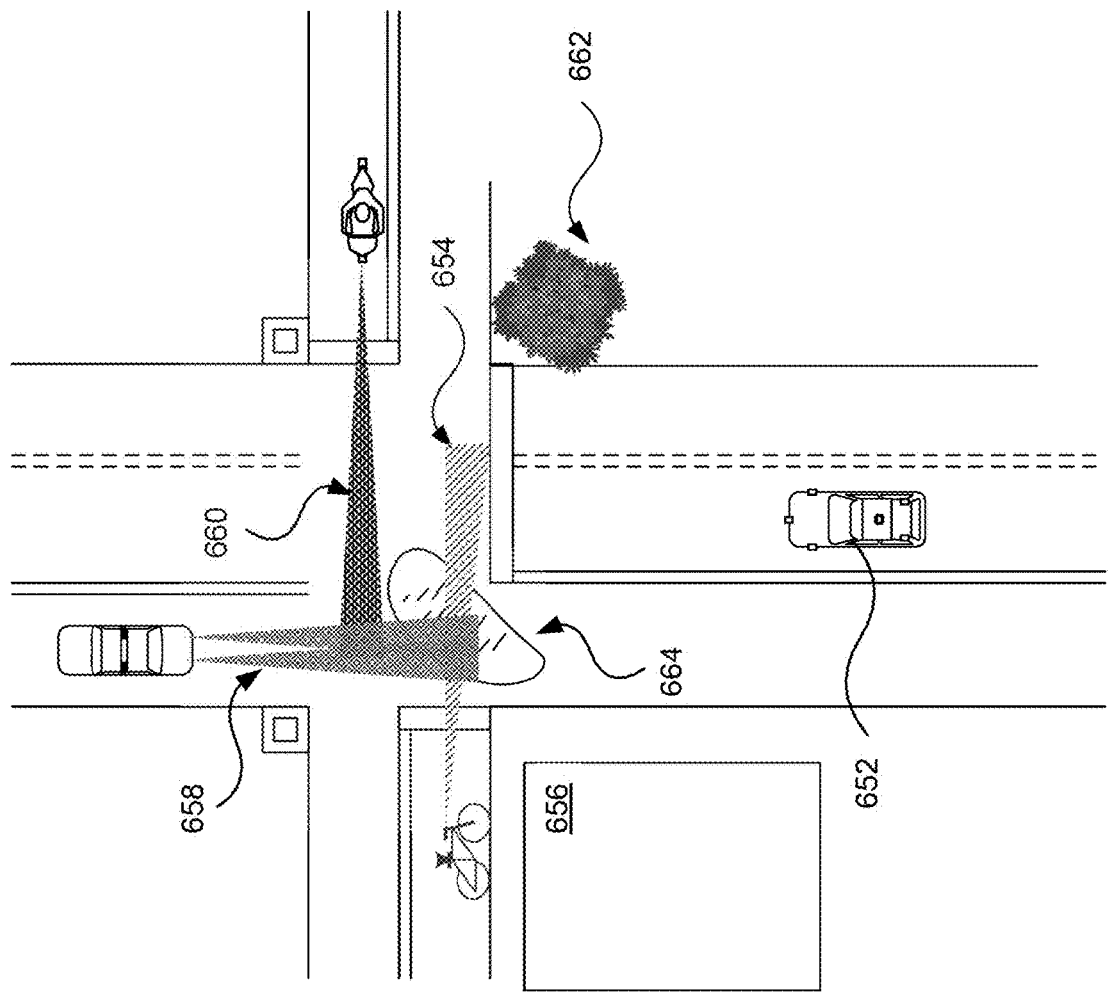

Identifying the source of illumination may be challenging for a number of reasons. As shown in scenario 650 of FIG. 6E, self-driving vehicle 652 may encounter beam patterns from different road users, such as (i) a beam pattern 654 from a bicyclist (who is blocked from line of sight view by building 656, (ii) an intersecting beam pattern 658 from a car, and (iii) an opposing beam pattern 660 from a motorcyclist approaching an intersection from the opposite direction (who is blocked from line of sight view by foliage 662). In addition, water, ice or another item 664 on the road surface, or fog, mist, smoke, dust, etc., may reflect, diffuse and/or scatter light. If light is reflecting off of other surfaces, the system can use ray tracking to make estimations of such light where the source could be situated. For instance, if the perception system is receiving data from a wall that has light bouncing off of it, and its shape and size is changing, the vehicle's onboard system can use that in combination with a stored map to make estimations from where the light could be originating.

Figure 6F:
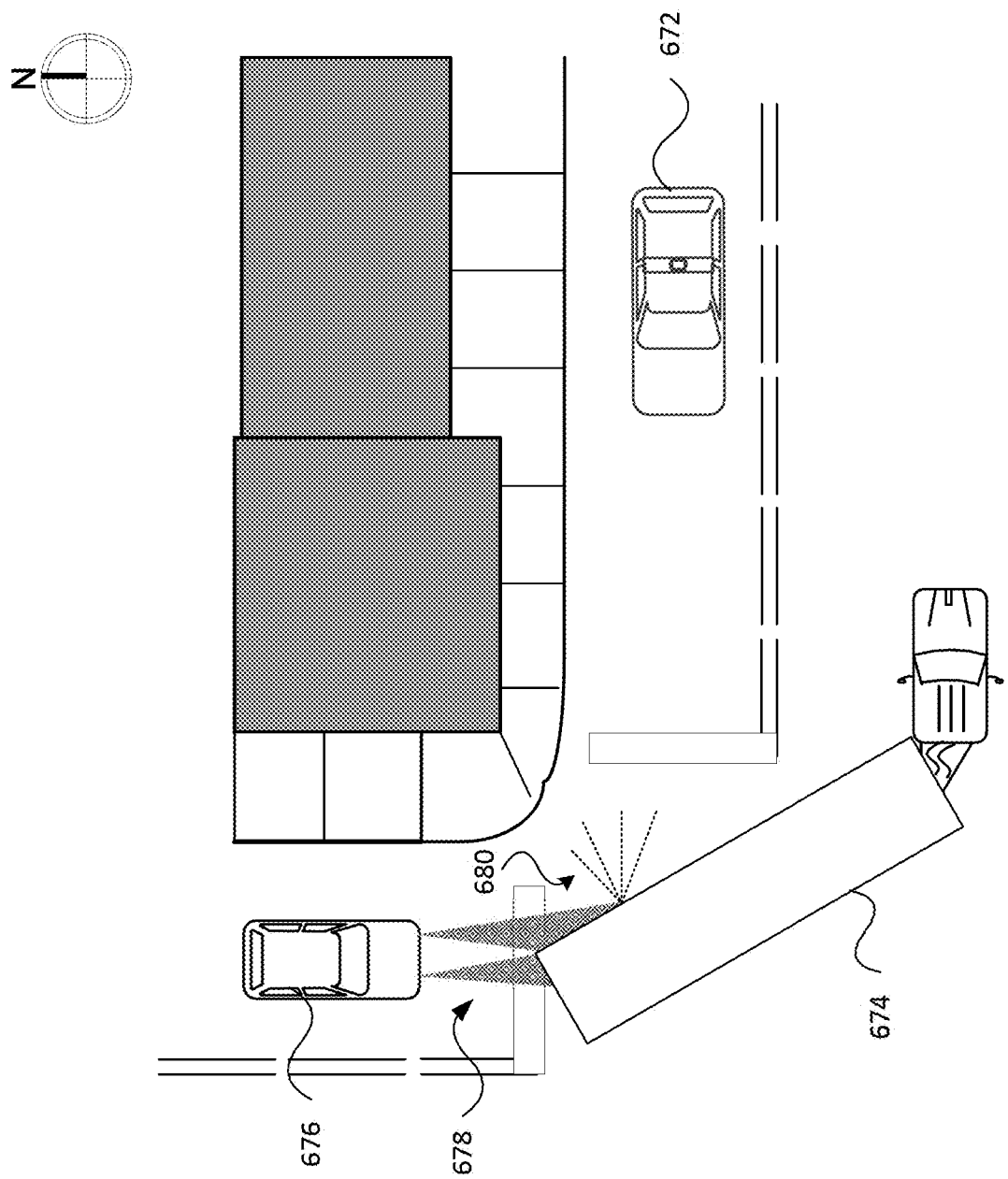

Another situation illustrated in scenario 670 of FIG. 6F is the reflection of light from an occluded object due to vehicles or other objects in the environment. For instance, self-driving vehicle 672 is shown as driving westbound on a roadway while a truck 674 is making a left turn from a southbound direction to head eastward along the roadway. Vehicle 676 is behind the truck 674 and is occluded from the self-driving vehicle 672 by the building at the corner of the intersection. Here, beam pattern 678 from the vehicle 676 may be partly blocked by the truck 674, as well as partly reflected as shown by dotted lines 680. This reflection, observed by the perception system of the self-driving vehicle 672, may indicate the presence of the vehicle 676. Alternatively or additionally, light emitted by the occluded object may reflect off of other objects in the environment, such as the windows of passenger vehicles or the windows of adjacent buildings, off of signage (e.g., stop or yield signs), etc. In one example, the self-driving vehicle 672 may use this information to alter how it approaches the intersection, how long it may wait at the intersection, and how it proceeds through the intersection. For instance, the self-driving vehicle may alter its rate of deceleration to approach the intersection more slowly. It may wait at the intersection for longer than initially planned (e.g., another 10-25% longer), such as to determine if more information about the occluded object is received. And when proceeding through the intersection, the vehicle 672 may vary how it pulls forward, such as to obtain more information from its perception system.

Figure 7B:
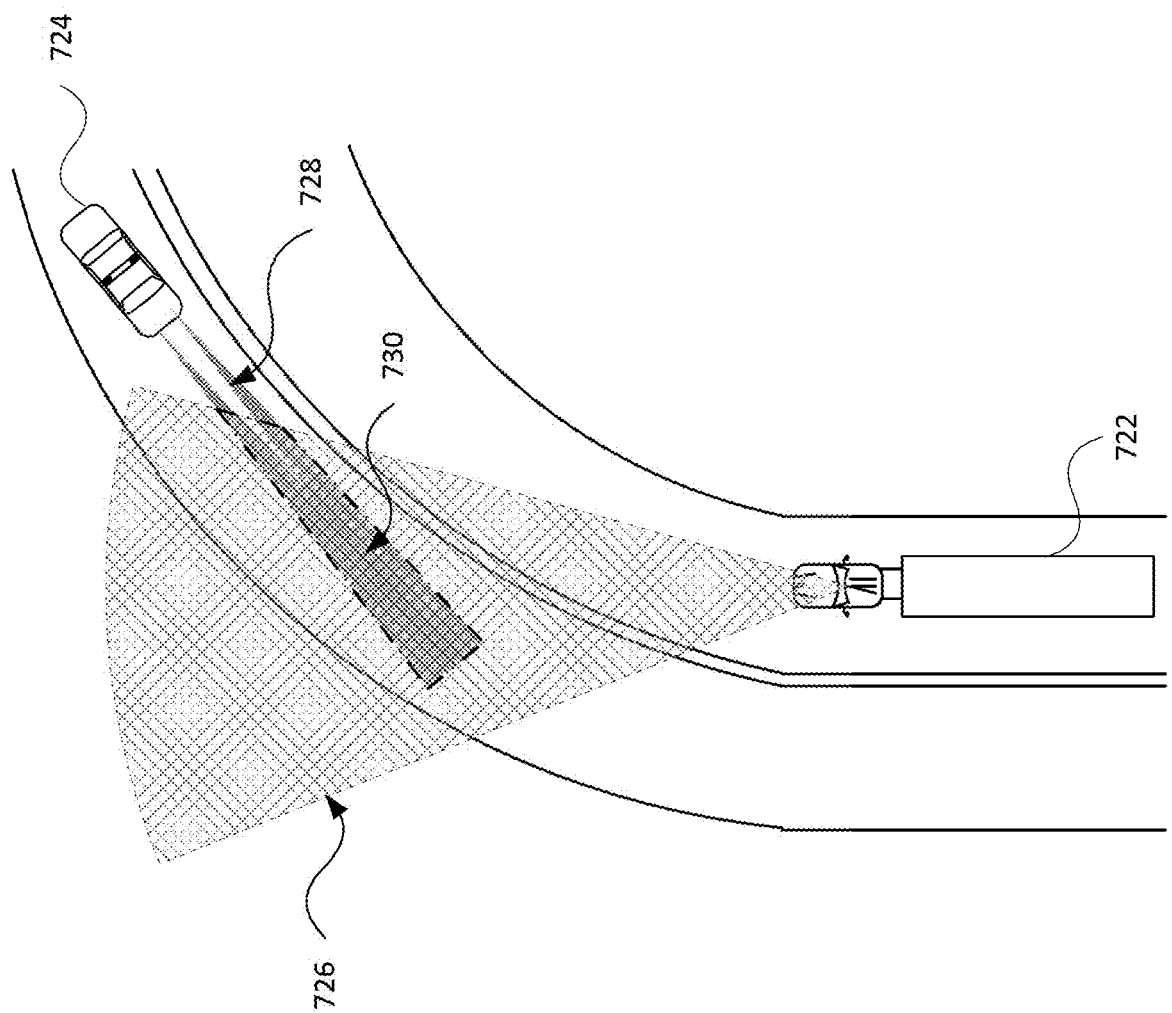

FIGS. 7A-7B illustrate additional scenarios in which the environment itself impacts a line of sight view to other road users. View 700 of FIG. 7A illustrates a scenario in which a passenger vehicle 702 is traveling up a hill in one direction, and a truck 704 is at the top of the hill oriented in the opposite direction. In this example, the truck 704 is shown having a sensor field of view 706 in a region in front of the truck. Here, if the passenger vehicle 702 has its low beams on, they may only illuminate a portion of the road (shown by beam pattern 708) that may not be in the field of view 706 or may otherwise be hard to detect. However, if the passenger vehicle 702 has its high beams on, depending on the environmental conditions (e.g., fog, dust or particulates in the air) they may illuminate other portions of the roadway (shown by beam pattern 710), which is readily detectable within the field of view 706, as shown by the dash-dot area 712.

View 720 of FIG. 7B illustrates a scenario in which a truck 722 is traveling along a curved road in one direction, and a passenger vehicle 724 is traveling in the opposite direction. In this example, the truck 722 is shown having a sensor field of view 726 in a region in front of the truck. Here, the passenger vehicle 724's lights illuminate a portion of the curved road shown by beam pattern 728, which is within the field of view 726, as shown by the dash-dot area 730. Depending on the roadway and the nearby environment, other reflections may also be detected and used in the analysis. For instance, on forest roads the trees may be lit up by an approaching vehicle's headlights. And the lane lines themselves or reflective components in the road can light up and reflect lights from the other vehicle.

Illumination information about the nearby environment around the self-driving vehicle may, by itself, be sufficient to identify the presence of an occluded vehicle or other road user (e.g., bicyclist or jogger). However, data obtained by other sensors of the self-driving vehicle and/or other information about the environment can be used to enhance the evaluation process. By way of example, acoustical information detected by onboard sensors may be of tires on the road surface, the sound of a horn honk, braking, etc. Lidar and/or radar sensors may provide complementary fields of view for optical sensors. A map of the localized area around the self-driving vehicle may include information about static light emitters, such as street lights, stop lights, flashers for pedestrian walkways, etc. It may also include elevation, grade, curvature and other data about the roadway itself. And environmental data about the amount of ambient illumination, weather (rain, snow, fog, temperature, humidity, etc.) and other aspects of the self-driving vehicle's surroundings can also be considered.

The onboard processing system (e.g., computing device 200 of FIG. 2 or 302 of FIG. 3A) is able to use the illumination information, either alone or with any other signals, to detect the presence of an occluded object. In one example, the system may compare an amount of detected light in a particular area and compare it to an expected amount of light (e.g., a baseline amount of light). If the detected amount of light exceeds the expected amount of light, then it may be determined that an occluded object is present. In another example, if the amount of detected light has one or more characteristics (e.g., a minimum amount of brightness, wavelengths in a particular band, light emitted by a particular kind of lamp or type of illumination device), then it may also be determined that an occluded object is present. Alternatively, the system may generate a likelihood that there is an occluded vehicle present. For instance, based on the analyzed information, the system may indicate an 85% likelihood of the presence of another vehicle. In conjunction with determining the presence of the object, or the likelihood of its presence, the system may estimate the speed and or heading (direction of travel) of the object. This can include disambiguating the direction of travel (e.g., eastbound v. westbound). Alternatively or additionally, the system may also be able to determine which side (or lane) of the roadway an object is on.

Object identification/classification may be performed by the onboard computing device(s), in conjunction with identification of the presence of the other object to determine a type of object and/or one or more characteristics of the object. By way of example, each vehicle may maintain a database or other record of different types of road user objects (e.g., sedan, truck, motorcycle, moped, bicycle, emergency vehicle, construction vehicle, farm equipment, pedestrian or jogger, etc.), static environmental objects (e.g., street lights, stop lights, billboards and other illuminated signage, reflective signs such as stop and yield signs, etc.), and/or illumination information associated with such objects, such as types of light sources (e.g., incandescent, halogen, LED, neon), wavelength and intensity information of the light sources, relative height of the light source to ground level, whether an object typically has two or more light sources (e.g., car, truck) or only one light source (e.g., bicycle, motorcycle, scooter, jogger), whether such lights are on continuously or typically pulse on and off, etc. It may also be of particular benefit to include information about different types of emergency vehicles (e.g., ambulance, fire truck, police car, etc.), since such vehicle types can be especially important to detect, so that the self-driving vehicle can take corrective action as needed (e.g., to pull over, slow down, change lanes or the like). In one scenario, the system compares the received sensor signals (e.g., detection of illumination along the roadway) and compares it against the illumination and other information in the database in order to identify a type of object.

The object identification/classification may include discriminating between and/or correlating among different light sources to identify the type(s) of occluded object(s). For example, different sources of light may include multiple road users, illumination from street lamps or stop lights, as well as reflections from one or more other objects such as vehicle windows, building windows or body panels (e.g., of a large truck). Here, the system may flag or exclude light from certain sources in the evaluation (e.g., light from overhead street lights or stop lights). The system may also correlate light from one or more reflecting surfaces, for instance using triangulation or trilateration techniques to determine the source(s) of reflected light.

Once an object of interest has been classified or otherwise identified, the system can use this information to infer the behavior of the identified object, to augment or otherwise modify current driving behavior of the self-driving vehicle, or both. By way of example, returning to scenario 600 of FIG. 6A, the self-driving vehicle 502 may determine with a high likelihood (e.g., 75% certainty or higher) that the portion of the beam pattern 602 detected by its perception system is from a passenger vehicle (not a motorcycle) traveling eastbound at 30 mph. Using map information of the road segments and the detected presence of the stop sign on the cross-street, the self-driving vehicle may infer that the passenger vehicle will maintain its current speed and pass through the intersection within 5-10 seconds. Based on this, the self-driving vehicle may alter the driving plan of edging out into the intersection and instead wait an additional amount of time before proceeding through the intersection.

In another example in view of scenario 670, the westbound self-driving vehicle 672 detects that truck 674 is turning eastbound onto the roadway. Based on the reflections shown by dotted lines 680 and possibly by direct observation of the beam pattern 678, the self-driving vehicle 672 may determine that there is a sedan behind the truck that is occluded by the building on the corner of the intersection. Here, the self-driving vehicle may evaluate the status of a traffic light (not shown) and an estimated velocity of the occluded sedan to predict whether the sedan will stop at the light or follow the truck through the intersection. The self-driving vehicle may determine whether to perform a braking or passive deceleration operation and/or take other corrective action based on this. For intersections, the system may estimate whether there is a red-light/stop-sign runner or any vehicles in the self-driving vehicle's blind spot. In one example, this could be tested by injecting fake vehicles/objects that could be moving at a high rate of speed into the data set. The presence of lights can be used to make such a test more accurate instead of assuming there is a motorcyclist coming down the road at a high rate of speed (e.g., 2-3 times the posted speed limit). Using the information from the lights, the system could estimate whether there might be a vehicle coming towards it at X mph, or even estimate the number of vehicles that could be present.

While detection, classification or other identification and inferring of behavior may all be performed by the onboard processing system of the self-driving vehicle, in another example offboard processing may be performed. For instance, a back-end system may perform fleet management operations for multiple self-driving vehicles, and may be capable of real time direct communication with some or all of the self-driving vehicles in the fleet. The back-end system may have more processing resources available to it than individual self-driving vehicles. Thus, in some situations the back-end system may be able to quickly classify and infer the behavior of an illuminating object in real time, and relay that information to the self-driving vehicle so that it may take corrective action or otherwise modify its planned driving operations.

In some examples, machine learning models, which may include neural networks, can be trained on illumination and other information, for instance to determine object types. This may be done for different types of driving environments, including freeways, urban, suburban and rural surface streets, tunnels, bridges, etc., both with and without other nearby objects (e.g., cars or other vehicles on the roadway, adjacent buildings, vegetation, roadway dividers, etc.). The training may be based on gathered real-world data, for instance with particular types of illumination in a single environment or different environments (e.g., that is labeled according to illumination type, location type, environmental conditions such as fog, time of day, temperature, etc.). From this, one or more light-based models may be developed and used in real-time signal evaluation by the self-driving vehicles, after the fact (e.g., post-processing) evaluation by the back-end system, or both. By way of example, the model structure may be a deep net, where the exact structure and parameters can be searched through automated machine learning, e.g., using a Neural Architecture Search (NAS) type model.

Based on this, the onboard system (e.g., planner module and/or navigation system of the vehicle's autonomous driving system) can utilize the model(s) to evaluate detected light, determining the likelihood that an occluded object is on the roadway and deciding on whether to alter the planned driving operations of the self-driving vehicle. The information could also be used in a reinforcement learning process. By way of example only, the reinforcement learning process may show that when a pair of headlights is detected on a cross street at night, the vehicle should wait at least a minimum number of seconds (e.g., 2-5 seconds) before making a turn or proceeding through the intersection.

As noted above, the technology is applicable for various types of self-driving vehicles, including passenger cars, buses, motorcycles, emergency vehicles, RVs, construction vehicles, and large trucks or other cargo carrying vehicles. In addition to using the illumination information for operation of an individual self-driving vehicle, this information may also be shared with other self-driving vehicles, such as vehicles that are part of a fleet.

Figure 8A:
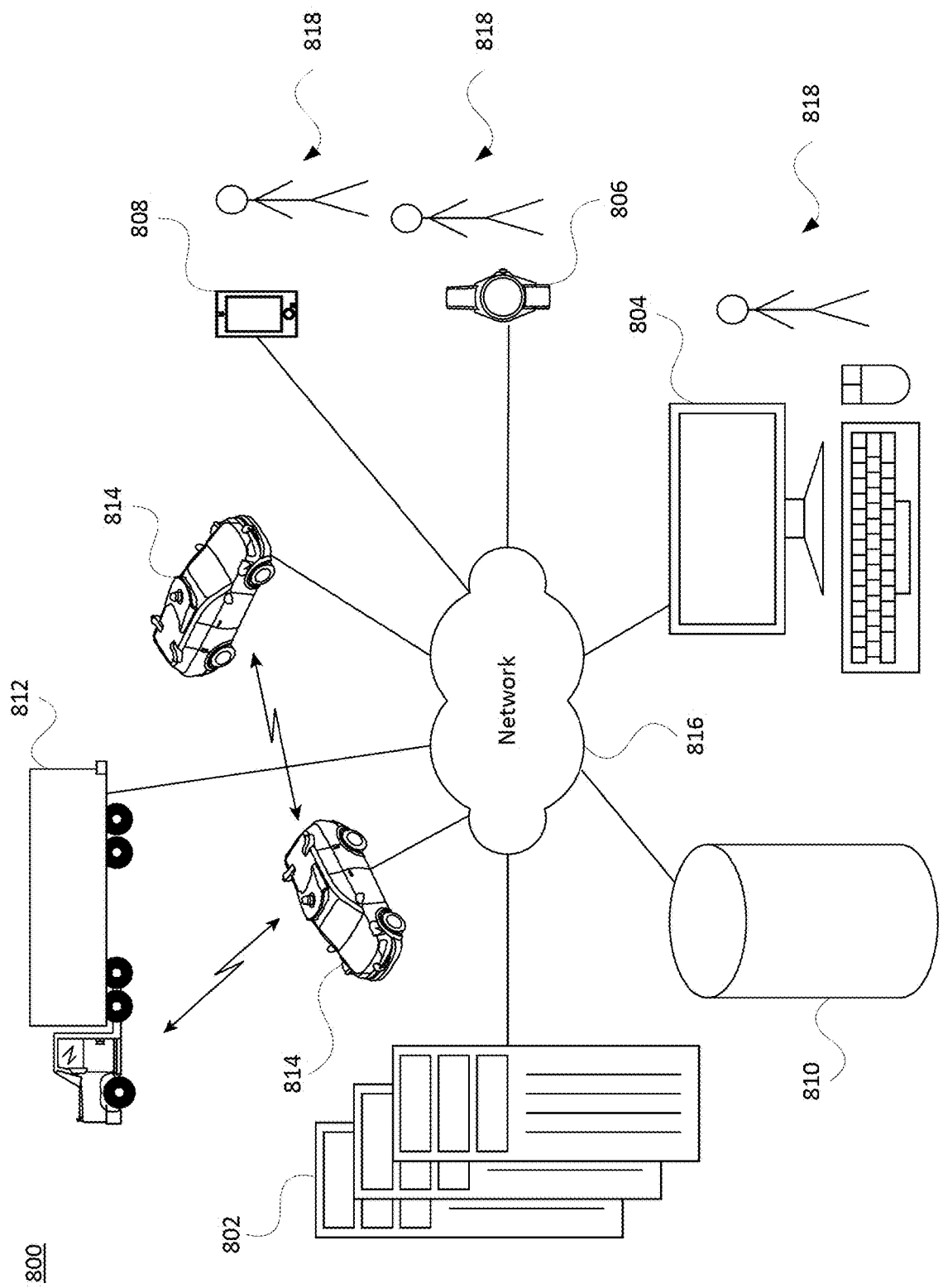

One example of this is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100 and 150 of FIGS. 1A-B and 1C-D, respectively. Vehicles 812 and/or vehicles 814 may be part of a fleet of vehicles. Although only a few vehicles and computing devices are depicted for simplicity, a typical system may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of self-driving vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 816 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with drivers of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help determine the source of observed illumination, classify the source, and/or identify appropriate responses by the self-driving vehicle. The result of this evaluation may be provided to one or more vehicles in the vicinity of the observed illumination. Additionally, this also might be the process used for obtaining labeled data to: 1) evaluate the accuracy of this approach; and 2) train any nets involved.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may also store autonomous vehicle control software which is to be used by vehicles, such as vehicles 812 or 814, to operate such vehicles in an autonomous driving mode. Storage system 810 may also store driver-specific or nominal driving models, as well as illumination and/or vehicle models and training data for different types of illumination. The model information may be shared with specific vehicles or the fleet as needed. It may be updated in real time, periodically, or off-line as additional driving information is obtained. The storage system 810 can also include map information, route information, weather information, etc. This information may be shared with the vehicles 812 and 814, for instance to help with behavior analysis by the on-board computer system(s), such as during real-time driving by a particular vehicle when light from a potentially occluded object is detected in the vehicle's external environment.

FIG. 9 illustrates an example method of operation 900 in accordance with the above discussions for operating a vehicle in an autonomous driving mode. At block 902, the method includes obtaining, by one or more sensors of a perception system of the vehicle, illumination sensor data from an external environment around the vehicle. At block 904, the processors detect, based on the obtained illumination sensor data, that an occluded object is present in the external environment. At block 906 the processors identify at least one of (i) a type of the object or (ii) one or more characteristics of the object. And at block 908; based on the least one of (i) the type of the object or (ii) the one or more characteristics of the object, the processors control operation of the vehicle in the autonomous driving mode, for instance by changing a braking, deceleration or acceleration profile, by changing lanes or a position within a lane, by altering a planned progression through an intersection, etc.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of operating a vehicle in an autonomous driving mode, the method comprising:
    detecting, by one or more sensors of a perception system of the vehicle, at least a portion of one or more beam patterns created on a road segment by an occluded vehicle in an environment external to the vehicle operating in the autonomous driving mode;
    determining, by one or more processors, an approximate speed and direction of travel of the occluded vehicle based on any of size or shape of the at least the portion of the one or more beam patterns;
    inferring, by the one or more processors based on the approximate speed and direction of travel of the occluded vehicle, a behavior of the occluded vehicle; and
    controlling, by the one or more processors, operation of the vehicle in the autonomous driving mode based on the inferred behavior of the occluded vehicle.

2. The method of claim 1, wherein the behavior of the occluded vehicle includes at least one of a speed or a heading of the occluded vehicle.

3. The method of claim 1, wherein inferring the behavior of the occluded vehicle is further based on a type of the occluded vehicle, which is identified as being one of a plurality of different types of emergency vehicles.

4. The method of claim 3, wherein the plurality of different types of emergency vehicles includes one or more of an ambulance, a fire truck, or a police vehicle.

5. The method of claim 1, wherein inferring the behavior of the occluded vehicle is further based on a type of the occluded vehicle, which is identified as a passenger vehicle or a cargo vehicle.

6. The method of claim 1, wherein inferring the behavior of the occluded vehicle is further based on a type of the occluded vehicle, which is identified as a passenger vehicle, a truck, a motorcycle, a bicycle or an emergency vehicle.

7. The method of claim 1, further comprising:
obtaining, by the perception system, illumination sensor data from the external environment; and
correlating, by the one or more processors, multiple sets of the illumination sensor data to determine a source of light.

8. The method of claim 7, wherein each set of the multiple sets of the illumination sensor data is obtained from a different sensor of the perception system of the vehicle.

9. The method of claim 1, wherein the determining further comprises determining one or more characteristics of the occluded vehicle that include at least one of location, orientation relative to a roadway, size, shape, heading, or speed of movement relative to the vehicle operating in the autonomous driving mode.

10. The method of claim 1, further comprising prior to controlling operation of the vehicle in the autonomous driving mode, disambiguating a direction of travel of the occluded vehicle.

11. The method of claim 1, further comprising:
obtaining, by the one or more sensors, illumination sensor data from the external environment; and
evaluating, by the one or more processors, the obtained illumination sensor data to determine whether an amount of detected light has one or more characteristics.

12. The method of claim 11, wherein the one or more characteristics include at least one of a minimum amount of brightness, wavelengths in a particular band, or light emitted by a particular type of illumination device.

13. The method of claim 1, further comprising:
obtaining, by the one or more sensors, illumination sensor data from the external environment; and
comparing, by the one or more processors, the obtained illumination sensor data to a baseline mapping of ambient illumination of the external environment.

14. The method of claim 13, wherein the baseline mapping includes identification of locations of one or more stationary illuminating objects in the external environment.

15. A vehicle configured to operate in an autonomous driving mode, the vehicle comprising:
a driving system including a steering subsystem, an acceleration subsystem and a deceleration subsystem to control driving of the vehicle in the autonomous driving mode;
a perception system including one or more sensors configured to detect at least a portion of one or more beam patterns created on a road segment by an occluded vehicle in an environment external to the vehicle operating in the autonomous driving mode;
a positioning system configured to determine a current position of the vehicle operating in the autonomous driving mode; and
a control system including one or more processors, the control system operatively coupled to the driving system, the perception system and the positioning system, the control system being configured to:
determine an approximate speed and direction of travel of the occluded vehicle based on any of size or shape of the at least the portion of the one or more beam patterns;
infer a behavior of the occluded vehicle based on the approximate speed and direction of travel of the occluded vehicle; and
control operation of the vehicle in the autonomous driving mode based on the inferred behavior of the occluded vehicle.

16. The vehicle of claim 15, wherein the behavior of the occluded vehicle includes at least one of a speed or a heading of the occluded vehicle.

17. The vehicle of claim 15, wherein the perception system is further configured to obtain illumination sensor data from the external environment, and the one or more processors are further configured to discriminate, based on the illumination sensor data, between multiple illumination sources to determine a presence of one or more road users in the external environment.

18. The vehicle of claim 17, wherein the one or more processors are further configured to correlate multiple sets of the illumination sensor data to determine a source of light.

19. The vehicle of claim 15, wherein the control system is further configured to disambiguate a direction of travel of the occluded vehicle.

20. The vehicle of claim 17, wherein the one or more sensors are further configured to obtain illumination sensor data from the external environment, and the one or more processors are further configured to compare the obtained illumination sensor data to a baseline mapping of ambient illumination of the external environment.

21. The method of claim 1, further comprising:
obtaining, by the one or more sensors, illumination sensor data from the external environment, wherein the illumination sensor data is obtained as the vehicle travels along one or more road segments, and the operation of the vehicle is further controlled in the autonomous driving mode based on map information of the one or more road segments.

22. The vehicle of claim 15, further comprising:
obtaining, by the one or more sensors, illumination sensor data from the external environment, wherein the one or more sensors obtain the illumination sensor data as the vehicle travels along one or more road segments, and the operation of the vehicle is further controlled in the autonomous driving mode based on map information of the one or more road segments.

23. The method of claim 1, wherein the one or more beam patterns are created by a headlight or a fog light of the occluded vehicle.

24. The vehicle of claim 15, wherein the behavior of the occluded vehicle is inferred based on a type of the occluded vehicle, which is identified as being one of a plurality of different types of emergency vehicles.

25. The vehicle of claim 18, wherein each set of the multiple sets of the illumination sensor data is obtained from a different sensor of the perception system of the vehicle.

* * * * *